United States Patent
Seki

(10) Patent No.: US 7,738,196 B2
(45) Date of Patent: Jun. 15, 2010

(54) OPTICAL UNIT

(75) Inventor: Akinobu Seki, Kawaguchi (JP)

(73) Assignee: Enplas Corporation, Saitama (JP)

( * ) Notice: Subject to any disclaimer, the term of this patent is extended or adjusted under 35 U.S.C. 154(b) by 13 days.

(21) Appl. No.: 12/284,595

(22) Filed: Sep. 23, 2008

(65) Prior Publication Data

US 2009/0086342 A1   Apr. 2, 2009

(30) Foreign Application Priority Data

Sep. 27, 2007 (JP) .............................. 2007-250983
Oct. 5, 2007 (JP) .............................. 2007-261950
Mar. 24, 2008 (JP) .............................. 2008-075761

(51) Int. Cl.
G02B 7/02 (2006.01)
(52) U.S. Cl. .................. 359/820; 359/823; 359/819
(58) Field of Classification Search ......... 359/694–700, 359/819–824

See application file for complete search history.

(56) References Cited

U.S. PATENT DOCUMENTS 5,587,846 A * 12/1996 Miyano et al. .............. 359/824
7,262,926 B2 * 8/2007 Ohsato ....................... 359/814

FOREIGN PATENT DOCUMENTS

| JP | 2003-295024 | 10/2003 |
| JP | 2005-101778 | 4/2005 |
| JP | 2007-163657 | 6/2007 |

* cited by examiner

*Primary Examiner*—Mohammed Hasan
(74) *Attorney, Agent, or Firm*—William L. Androlia; H. Henry Koda

(57) ABSTRACT

An optical unit is provided which includes gaps dR1 and dR2 in a radial direction that prevent an optical component from being affected by external stress during thermal expansion is formed between an outer circumferential surface of the optical component and an inner circumferential surface of a holder and gaps $d_{OA1}$ and $d_{OA2}$ that prevent the optical component adjacent to a pressing component from being affected by external stress during thermal expansion and are formed between predetermined surfaces on the pressing component and the optical component adjacent to the pressing component opposing each other in an optical axis direction.

16 Claims, 22 Drawing Sheets

[Fig.1]
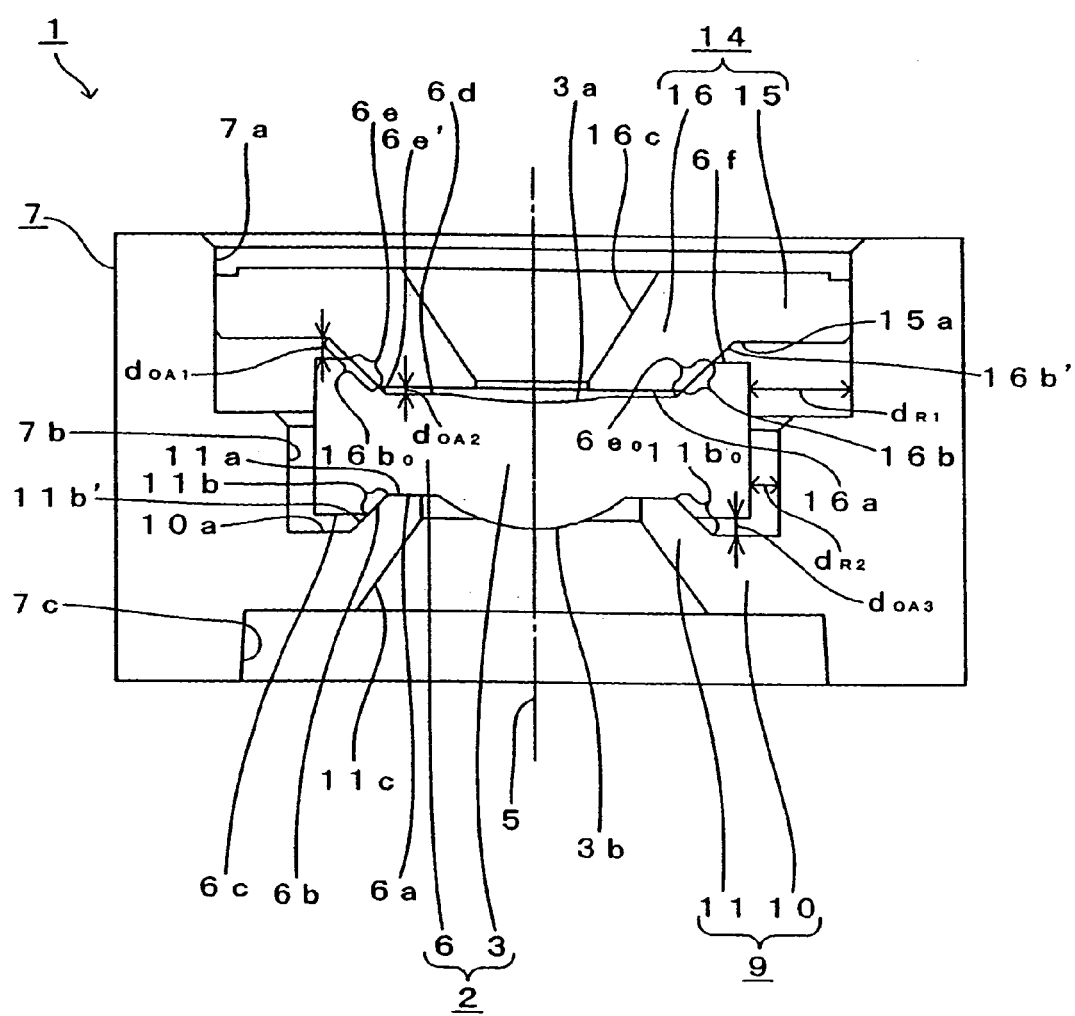

[Fig.2]
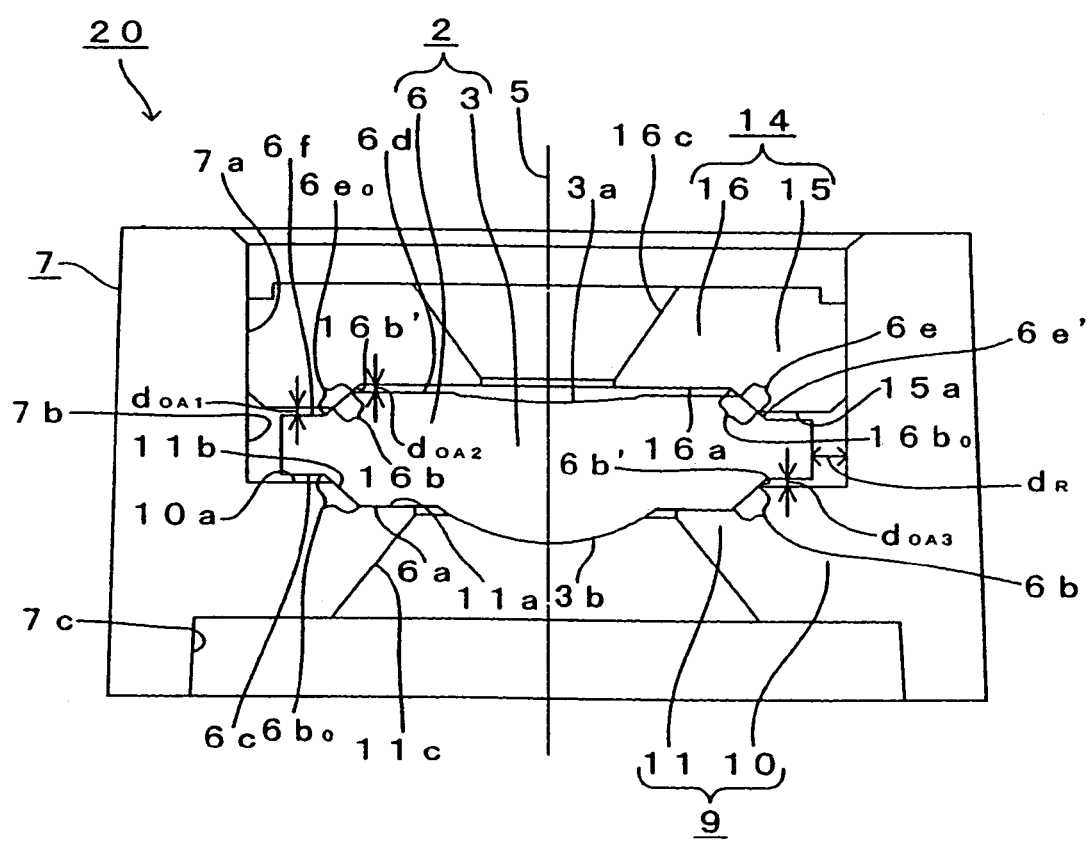

[Fig.3]
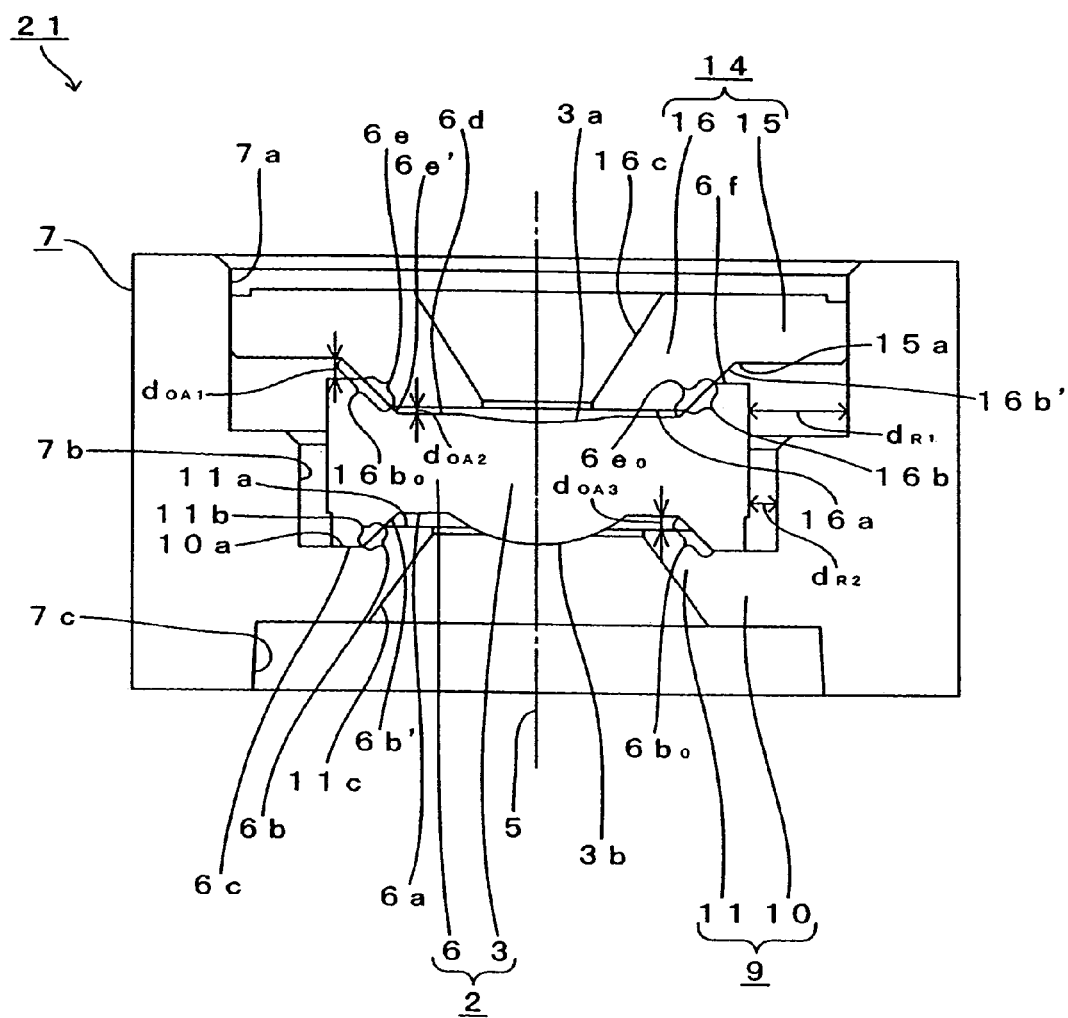

[Fig.4]
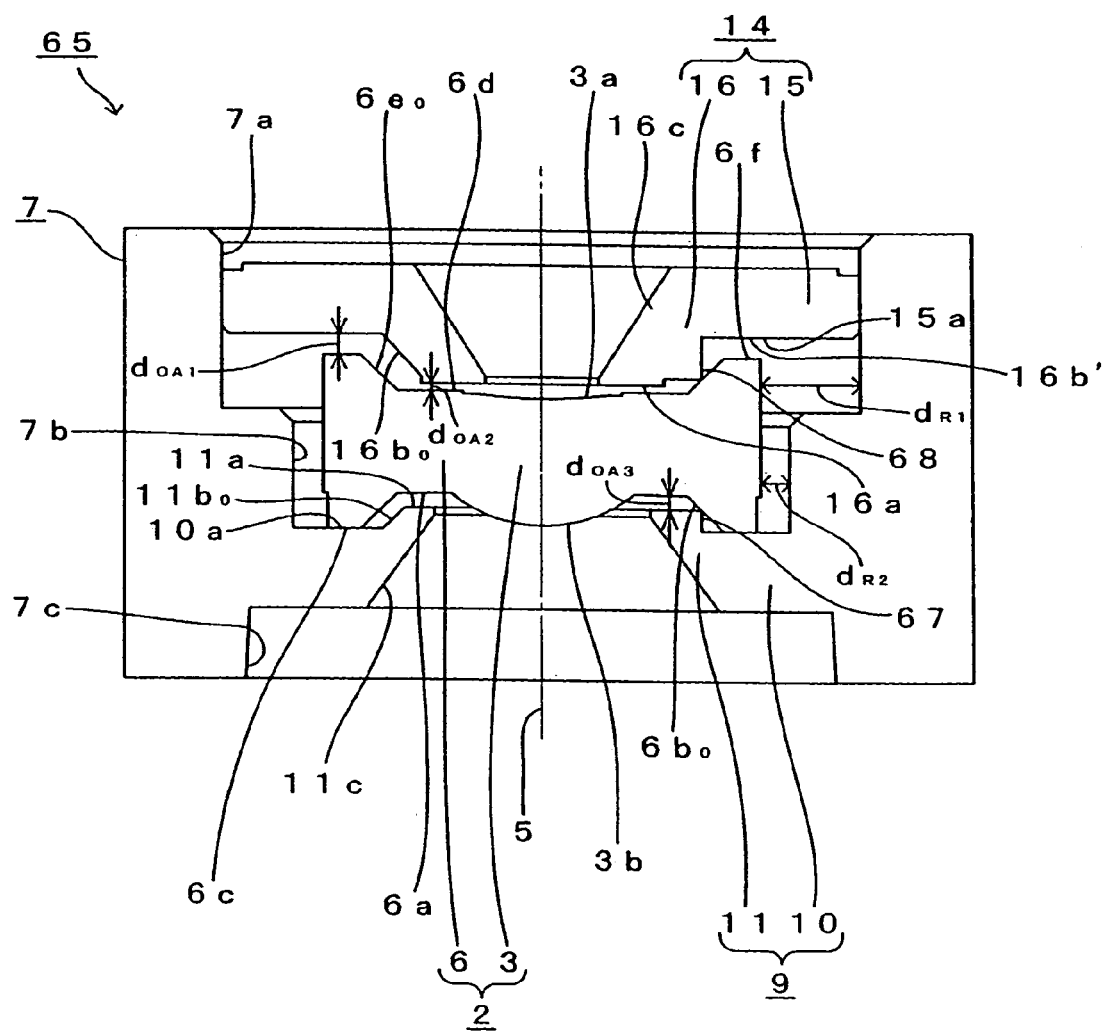

[Fig.5]
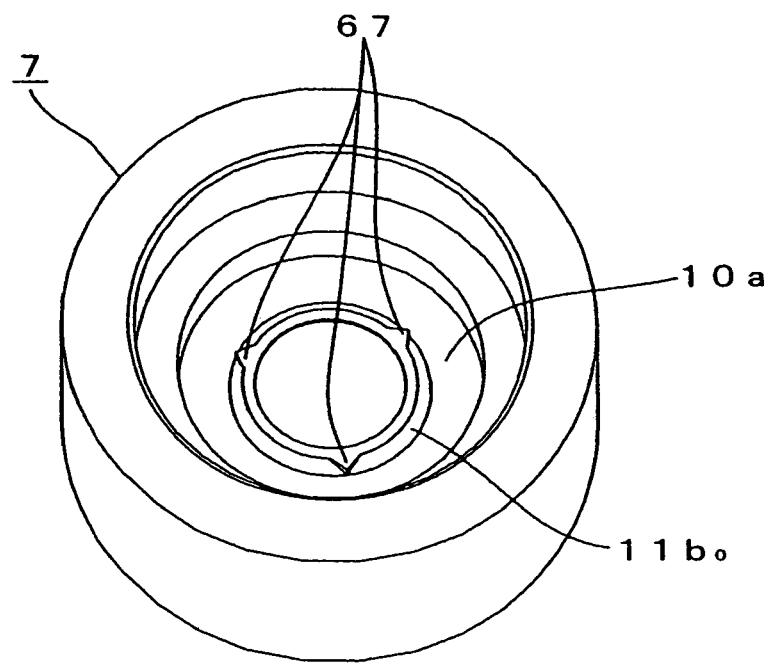

[Fig.6]
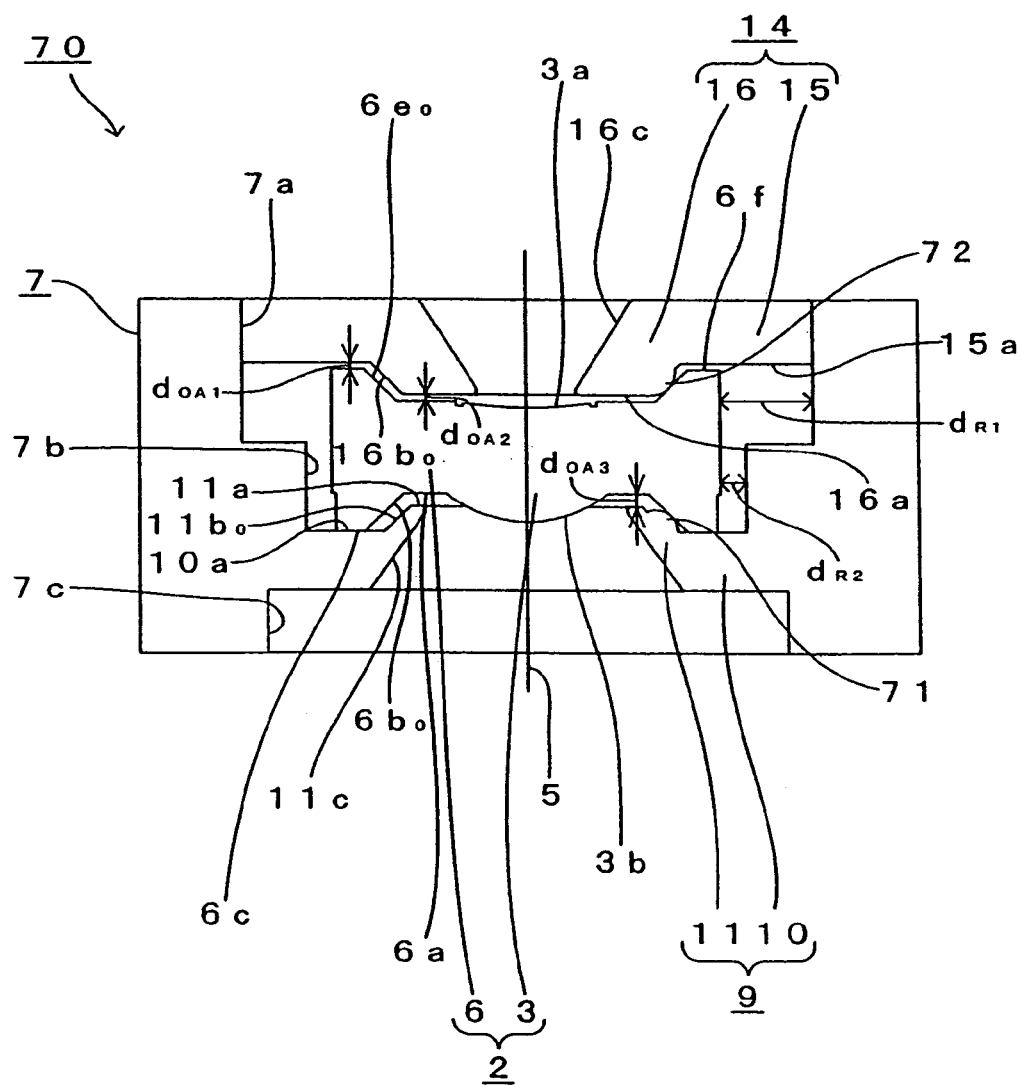

[Fig.7]
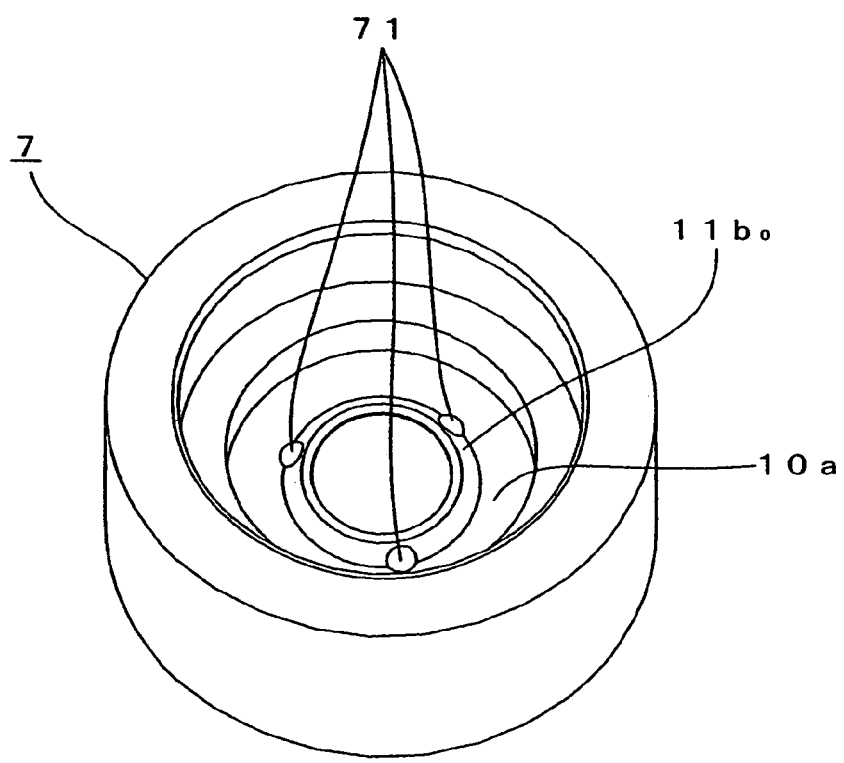

[Fig.8]
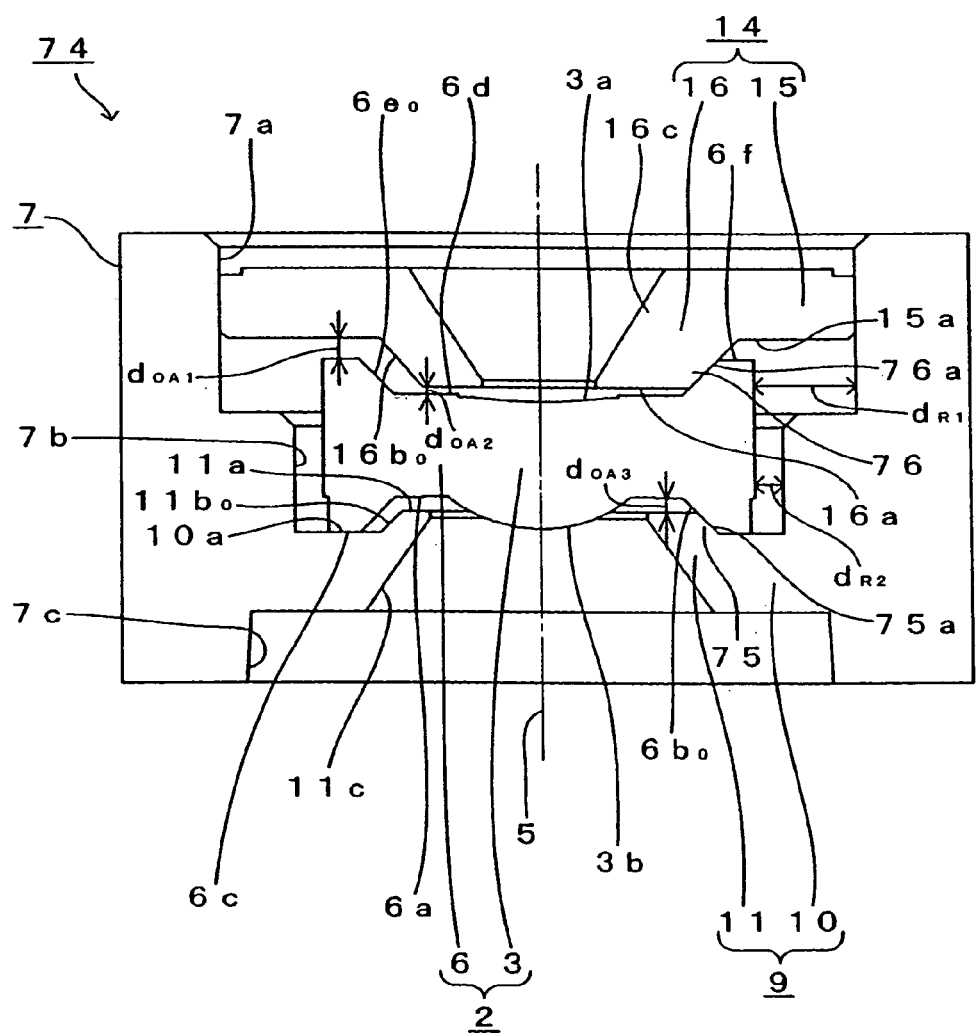

[Fig.9]
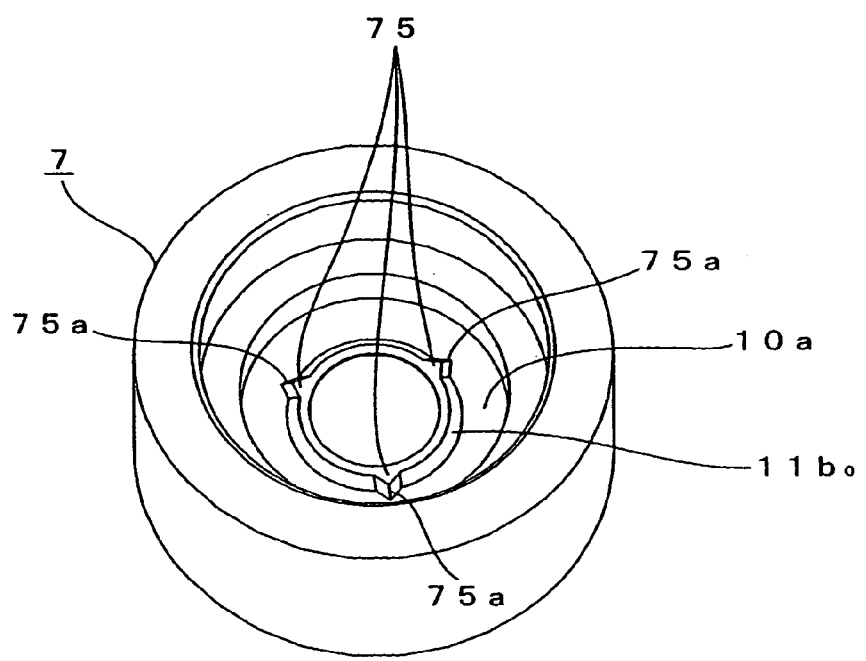

[Fig.10]
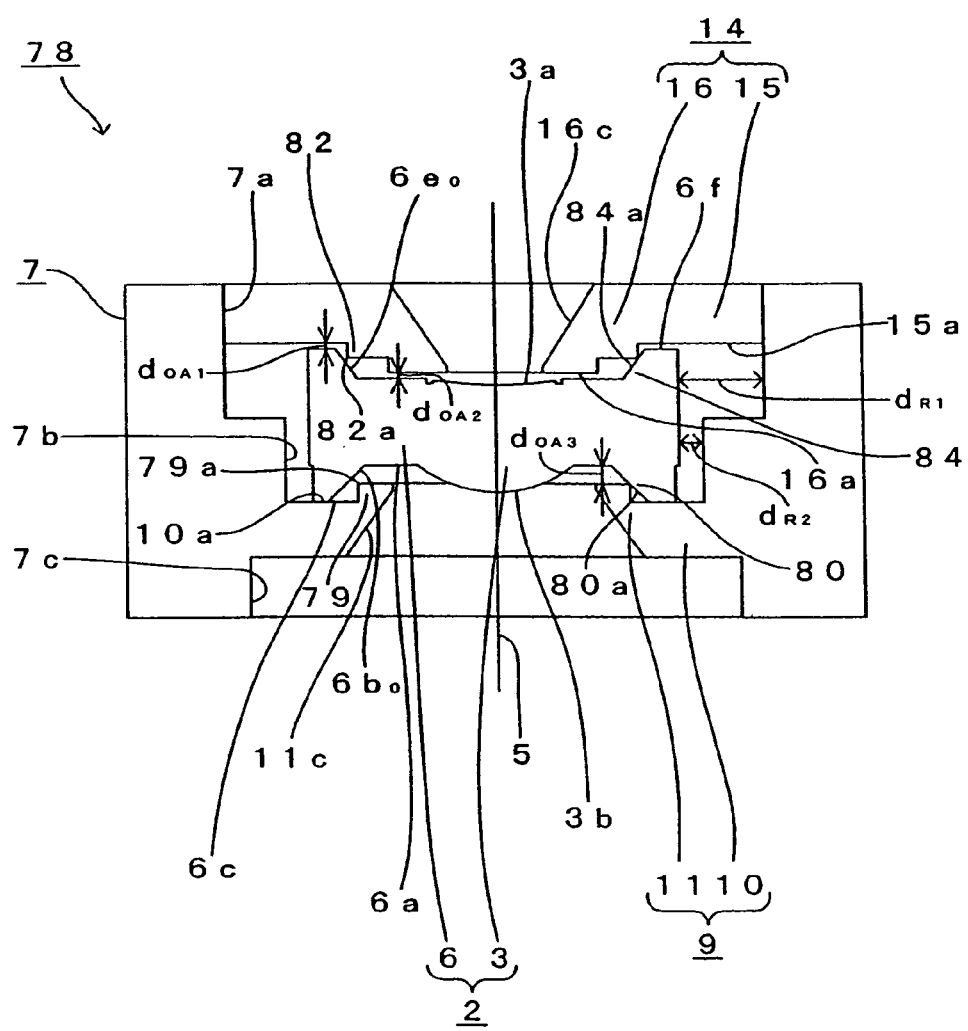

[Fig.11]
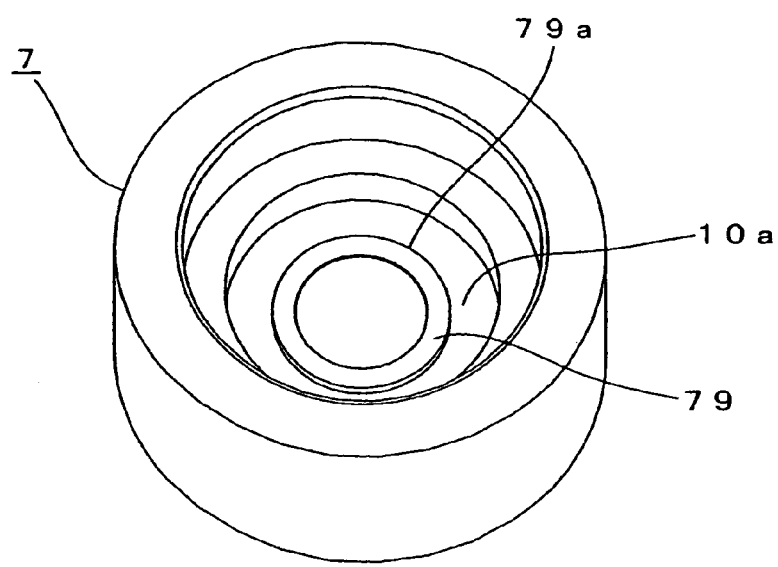

[Fig.12]
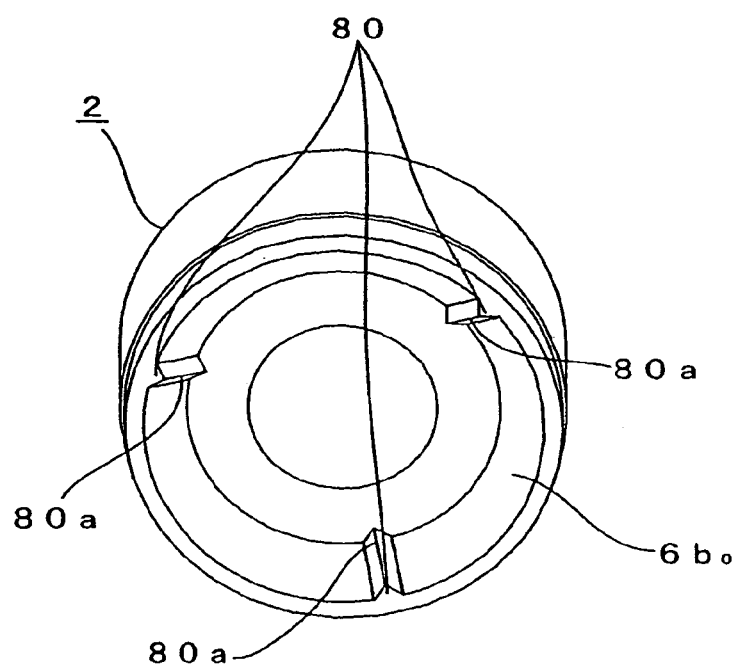

[Fig.13]
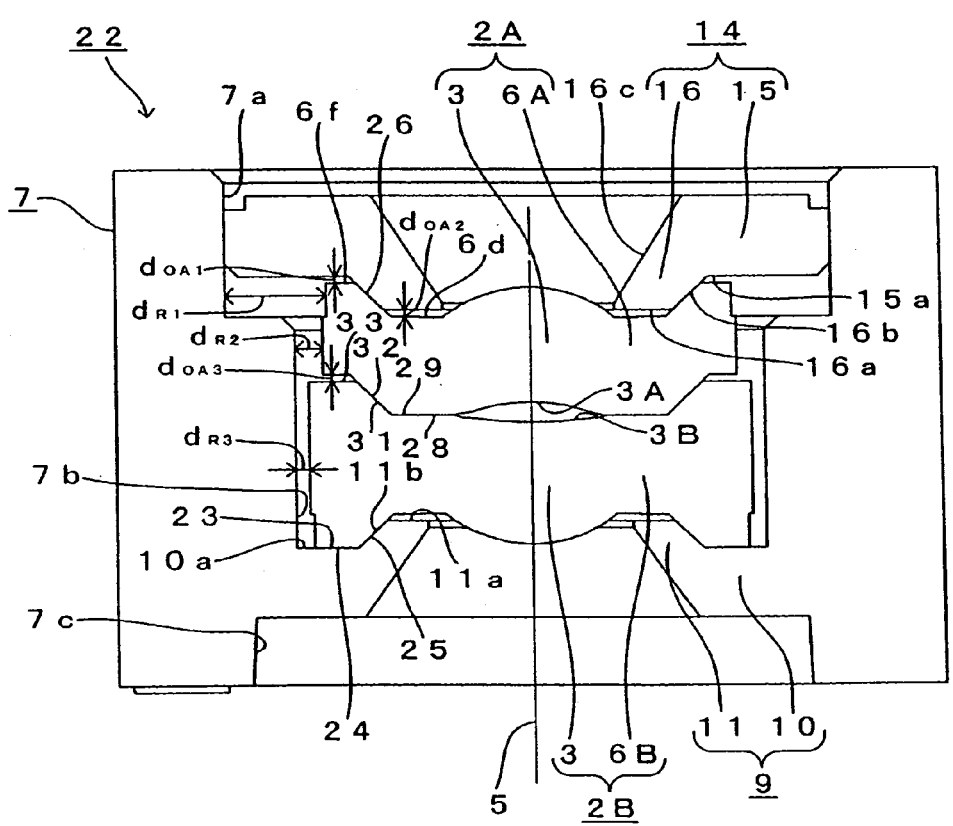

[Fig.14]
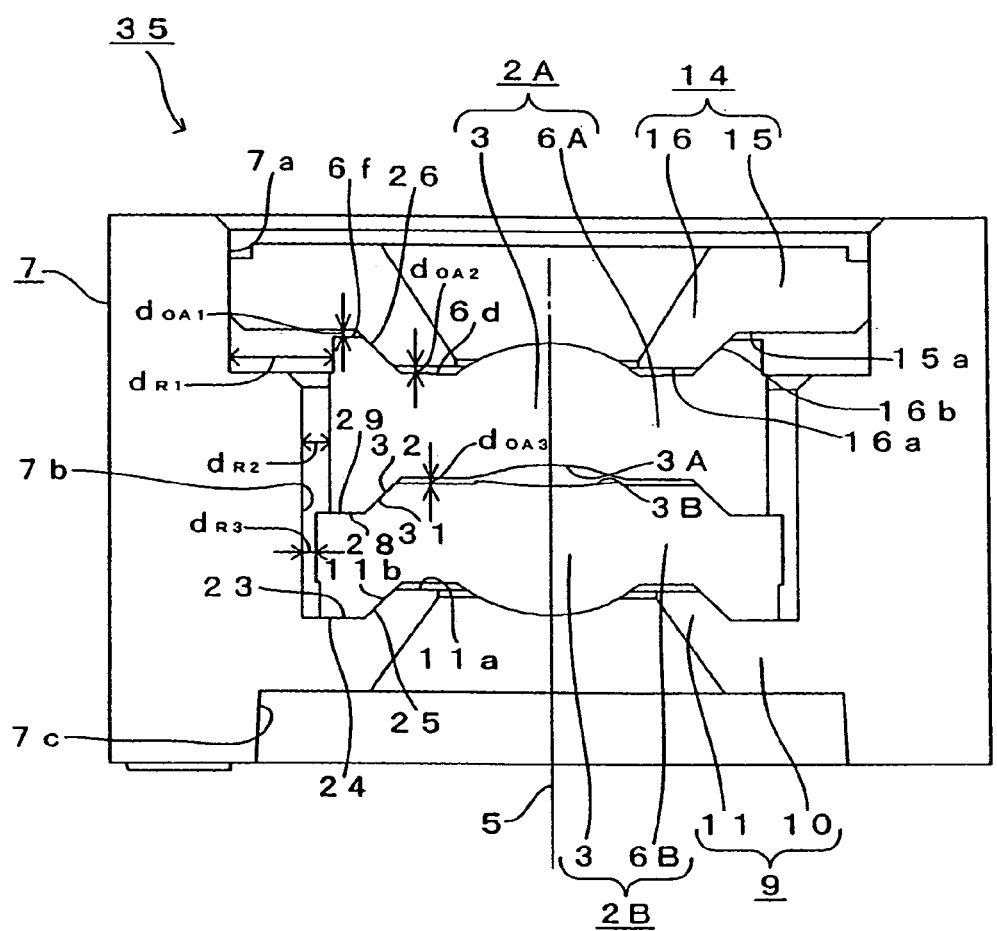

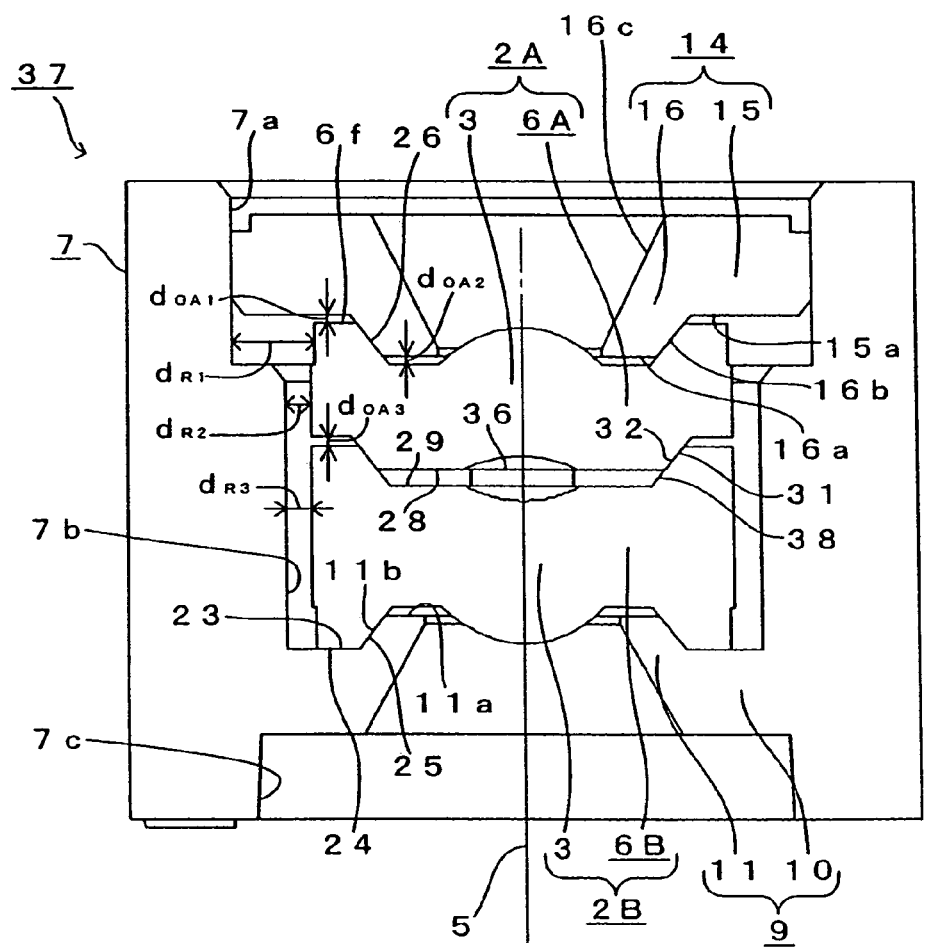
[Fig.15]

[Fig.16]
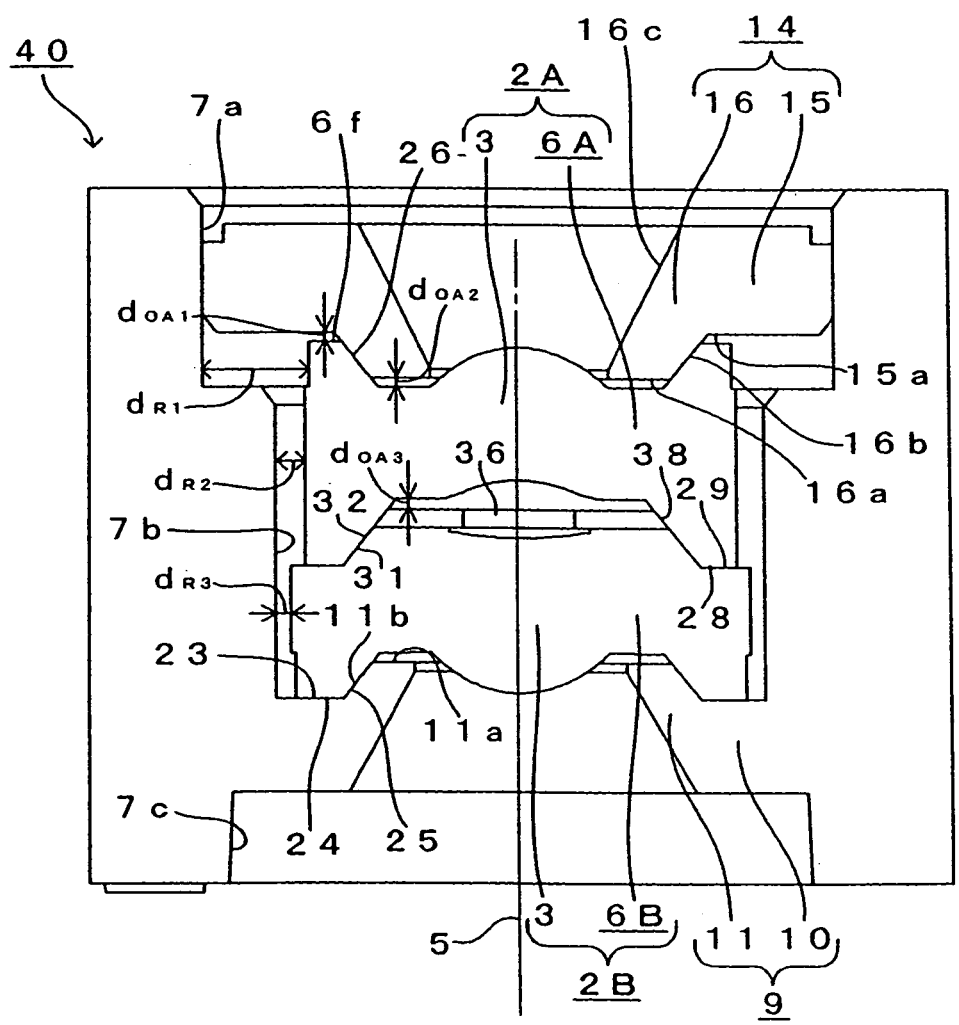

[Fig.17]
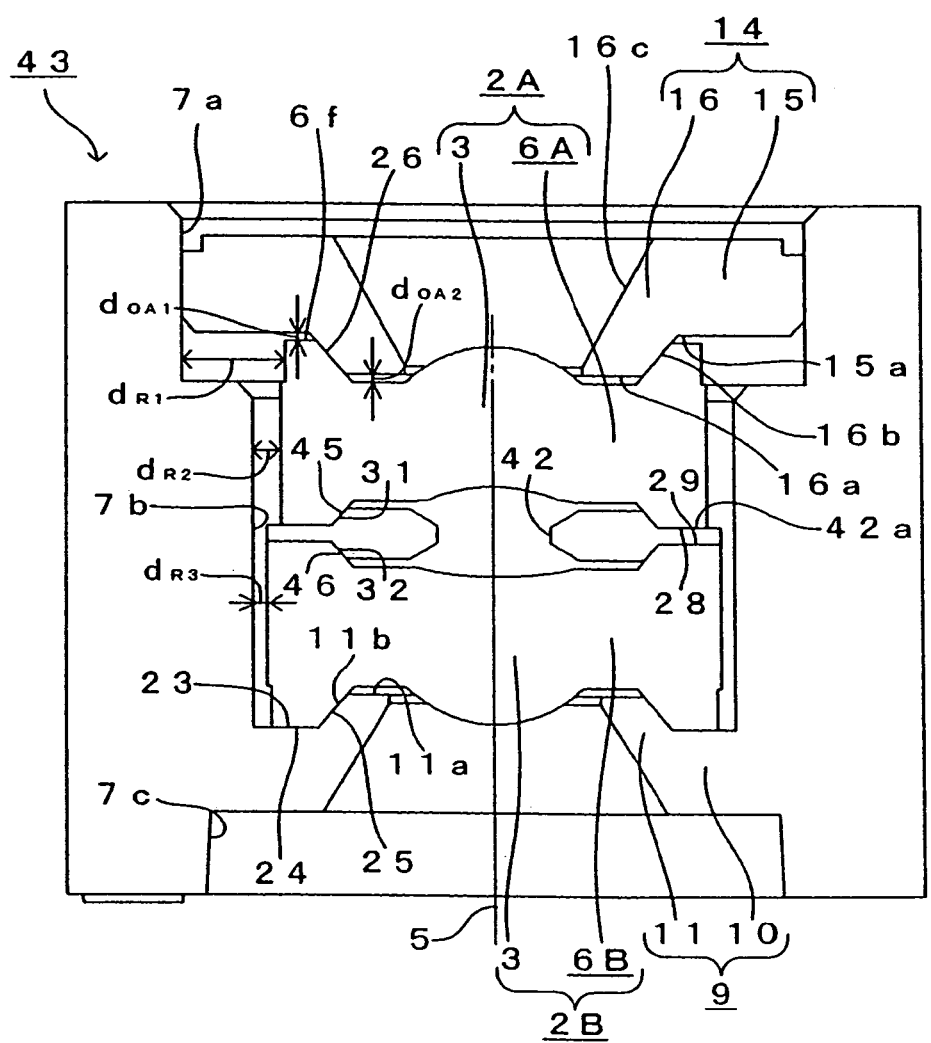

[Fig.18]
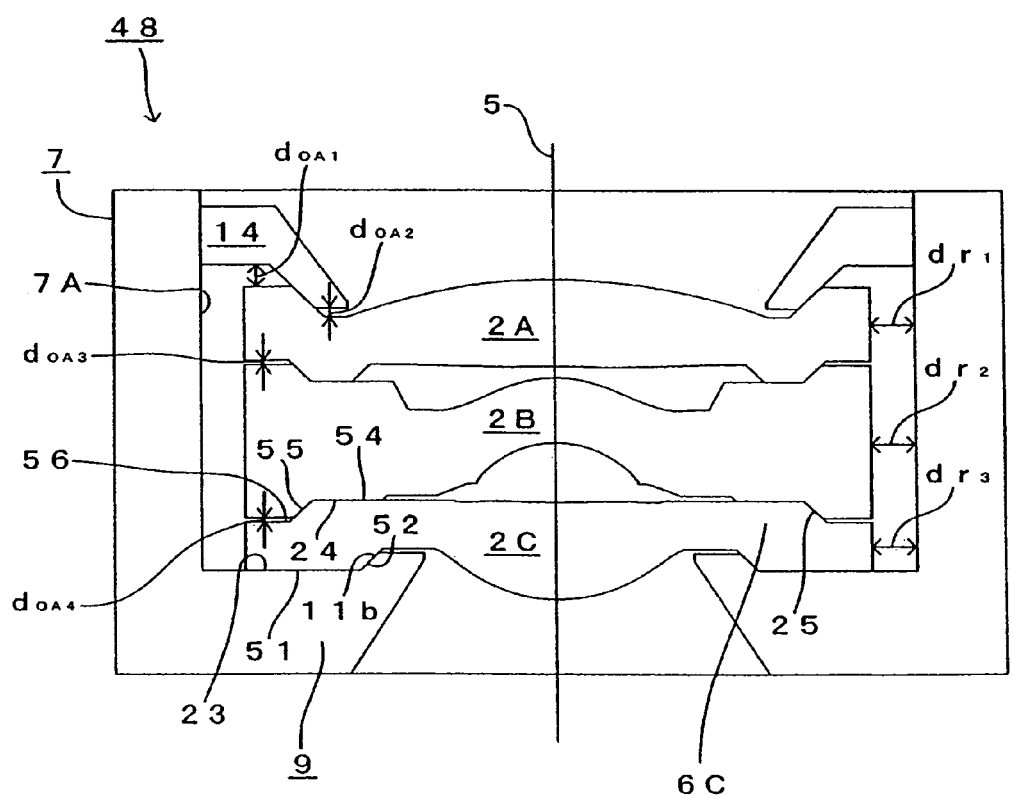

[Fig.19]
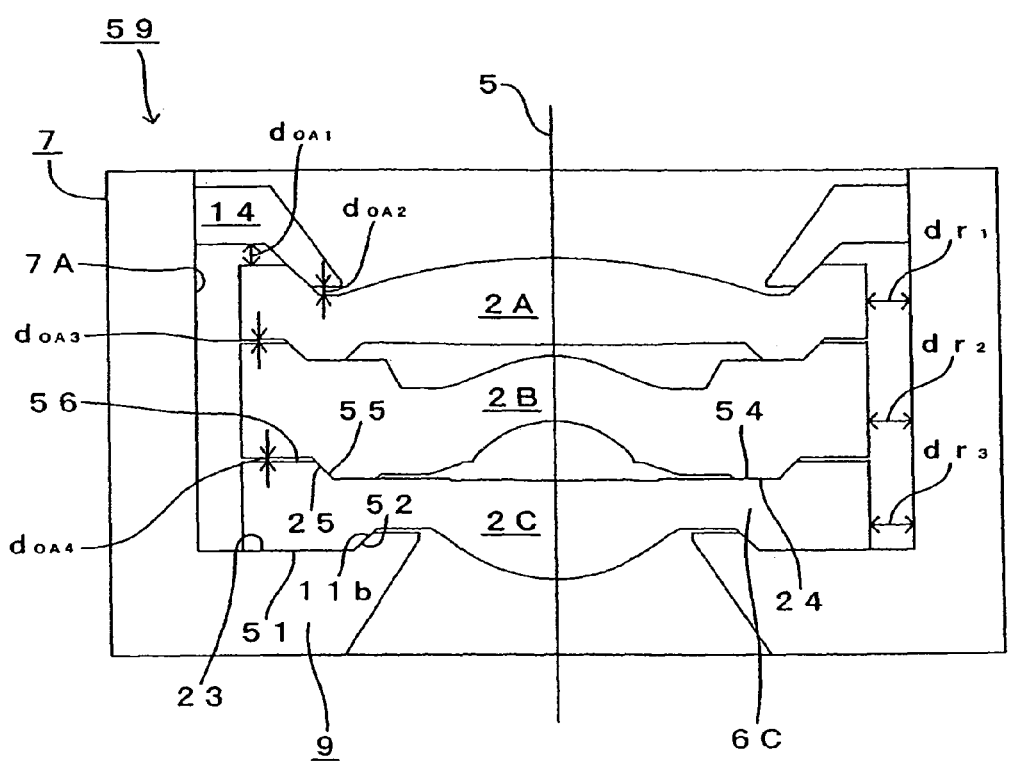

[Fig.20]
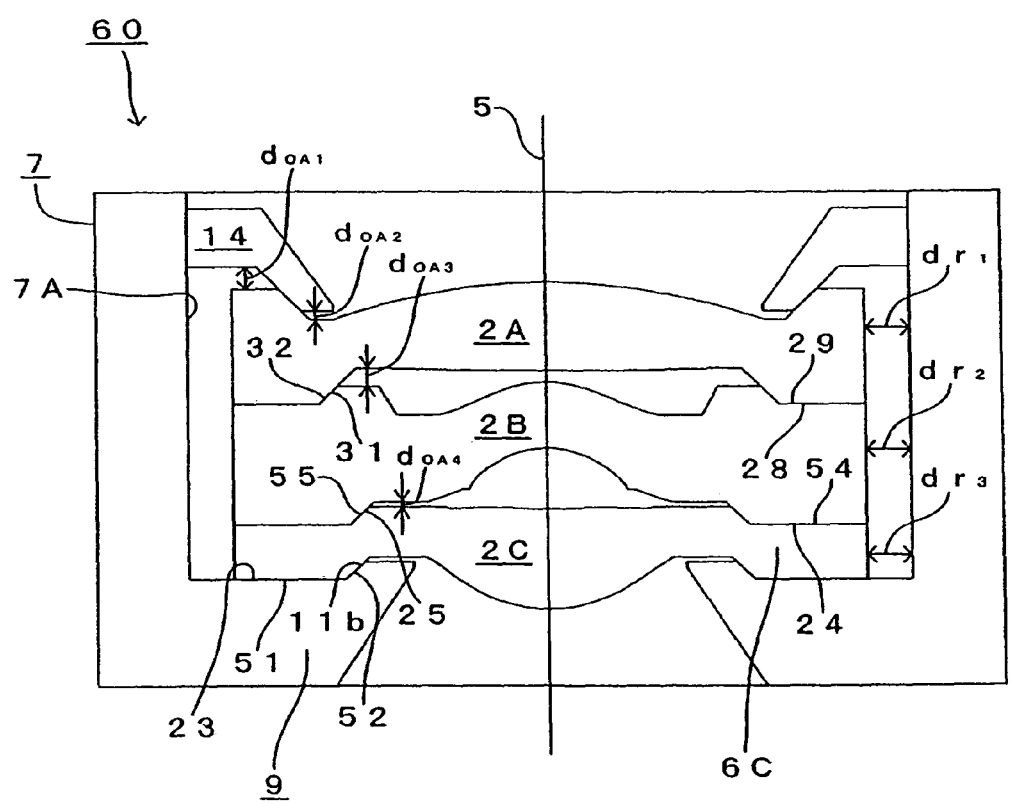

[Fig.21]
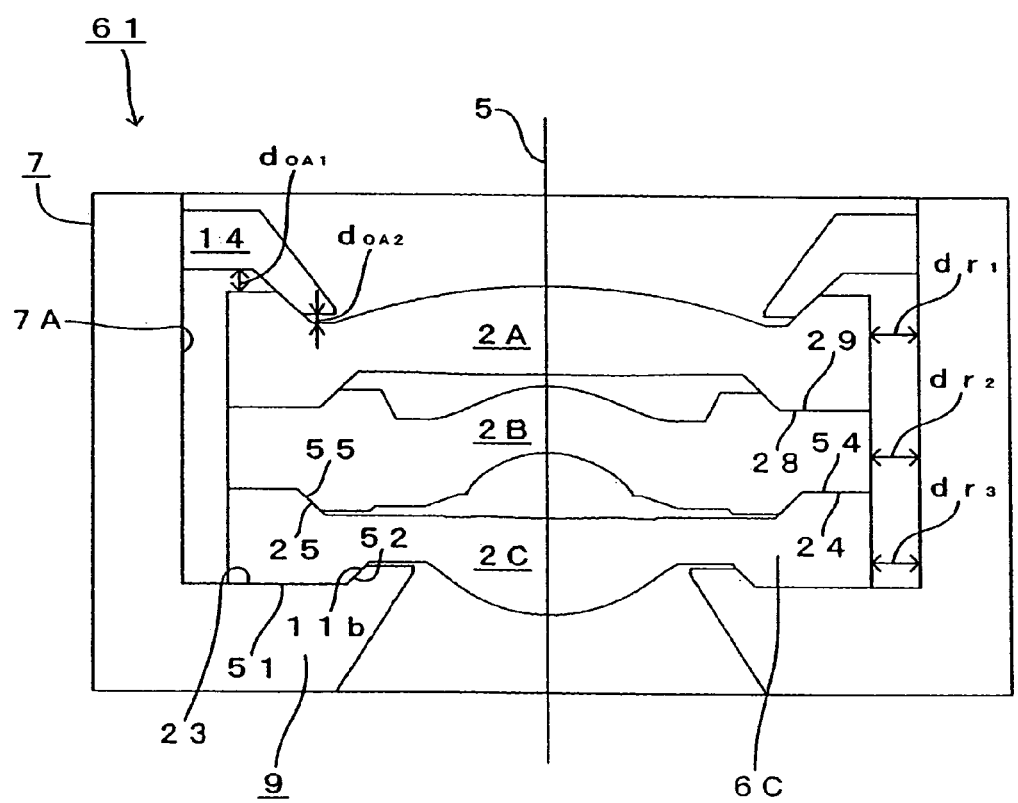

[Fig.22]
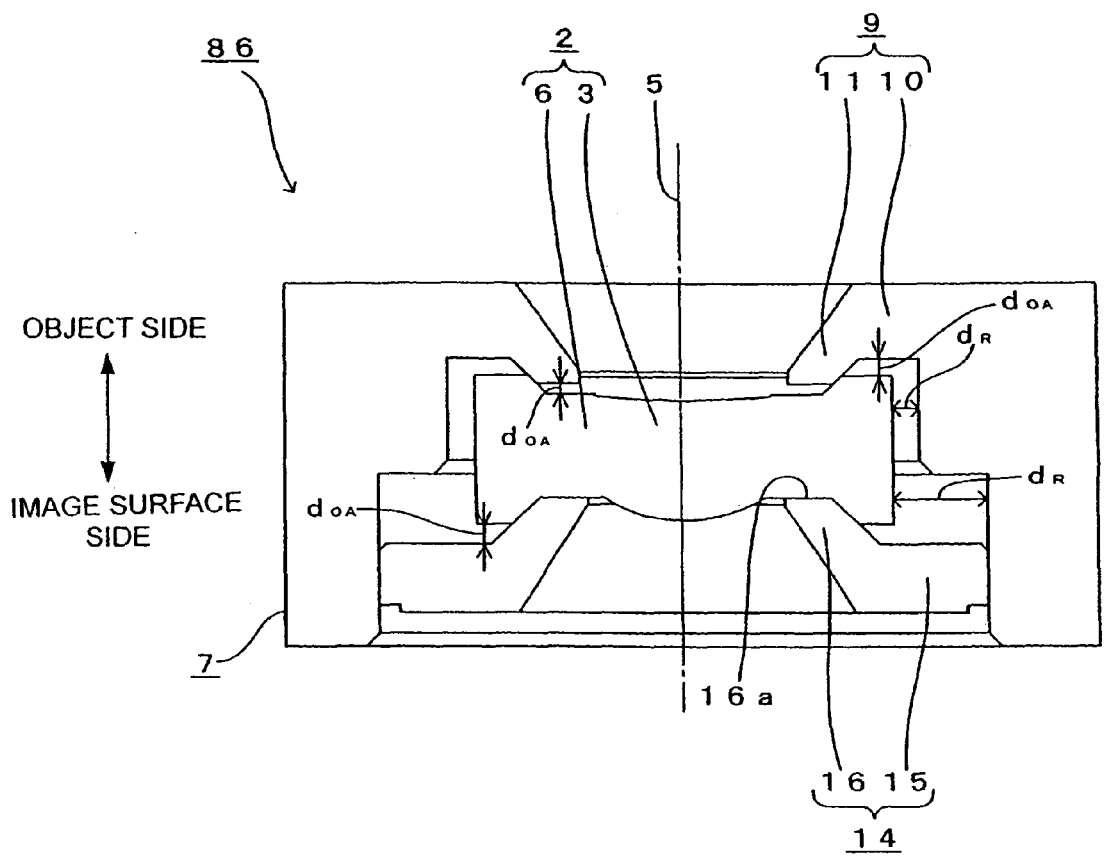

OPTICAL UNIT

BACKGROUND OF THE INVENTION

1. Field of the Invention

The present invention relates to an optical unit. In particular, the present invention relates to an optical unit in which optical components are housed within a holder.

2. Description of the Related Art

Since the past, an imaging device using an image sensor element, such as a charge-coupled device (CCD) and a complementary metal oxide semiconductor (CMOS), mounted on a portable computer, a television phone, a portable phone, a digital camera, and the like, has been using a lens unit having a lens for forming an image of an object on a sensor surface of the image sensor element.

Within this type of lens unit, there is a lens unit that is assembled as follows. A lens is housed within a cylindrical holder while position adjustment (centering) of an optical axis of the lens is being performed. The housed lens is then pressed by a pressing component. Moreover, among lens units assembled in this way, there is a lens unit in which a tapered surface is formed on a flange section of the lens. The lens is housed within a holding section within the holder in a state in which the tapered surface is in contact with the holding section or a tapered surface of another lens (refer to, for example, Patent Literature 1).

Conventionally, when various lens units such as this that are mounted on imaging devices are mounted on a circuit board to which the lens unit is assembled to achieve modularization, the image sensor element is attached to a lens unit by a thermosetting resin and the like. A socket (an integrated circuit [IC] socket) is attached to the circuit board by reflow soldering. Subsequently, the image sensor element is fitted into the socket. A connector serving as the socket is described in Japanese Patent Laid-open Publication No. 2005-101778.

The socket is attached to the circuit board by reflow soldering and the lens unit is mounted on the circuit board by separate processes to prevent changes in optical performance caused by thermal expansion of the lens in the lens unit as a result of exposure to a high temperature environment during reflow soldering.

In other words, each component configuring the lens unit such as the lens, the holder, the pressing component, and a diaphragm, may be formed from materials with different linear expansion coefficients. If the lens unit is exposed to a high temperature at which reflow soldering is performed in an instance such as this, an amount of change in dimensions caused by thermal expansion of each component differs because of differences in the linear expansion coefficient of each component. As a result, the thermally-expanding lens presses against another component in the lens unit, such as the holder, another lens, or the diaphragm, and is affected by external stress from the other component. The lens that has been thermally expanded and affected by the external stress does not return to its original lens shape before thermal expansion, even when the reflow soldering is completed and the lens is cooled. As a result, changes occur in optical performance. To prevent a situation such as this, conventionally, the reflow soldering of the socket onto the circuit board and the mounting of the lens on the circuit board are required to be performed through separate processes However, a number of processes increases when the mounting of the lens unit on the circuit board and the reflow soldering are performed by separate processes. Moreover, as a result of the socket being required, a number of component in a module increases.

As a method of mounting the lens unit on the circuit board without performing reflow soldering, there is a method in which, for example, after a flexible printed circuit (FPC) to which the image sensor element is attached to the lens unit by a thermosetting resin or the like, the FPC is fitted onto the circuit board. However, similar to when the socket is used, a method such as this causes an increase in the number of components because the FPC is required. Moreover, the FPC is expensive. Therefore, the method is not suitable for cost reduction.

Therefore, as described in Patent Literature 2, for example, a technology has been proposed that allows mounting of the lens unit on the circuit board to be performed in a same process as that for reflow soldering, while suppressing deterioration of the optical performance of the lens caused by the thermal expansion of the lens unit.

In other words, in Patent Literature 2, a lens unit is disclosed in which an elastic spacer presses a lens placed within a case, and an elastic ring surrounds an outer circumference of the lens, thereby holding the lens. In a lens unit such as this, a change in the dimensions of the lens during thermal expansion is absorbed by deformation of the elastic spacer and the elastic ring. Therefore, the external stress applied to the lens can be reduced to a certain extent.

Patent Literature 1: Japanese Patent Laid-open Publication No. 2007-163657

Patent Literature 2: Japanese Patent Laid-open Publication No. 2003-295024

However, even in the lens unit described in Patent Literature 2, external stress from the elastic spacer and the elastic ring may be placed on the lens when the lens and the like thermally expand. Therefore, the lens unit is not necessarily optimal for external stress reduction.

Moreover, in the lens unit described in Patent Literature 2, components separate from the lens, namely the elastic spacer and the elastic ring, are required. Therefore the increase in the number of components still occurs, similar to when the above-described socket and FPC are used.

SUMMARY OF THE INVENTION

Therefore, the present invention has been achieved in light of the above-described issues. An object of the present invention is to provide an optical unit that can reduce changes in optical performance caused by thermal expansion and maintain desired optical performance, in addition to reducing a number of components.

In order to achieve the aforementioned object, an optical unit according to a first aspect of the present invention includes at least one optical component, a holder, and a pressing component. The holder is a cylindrical holder housing the optical component, in which a holding section for holding the optical component from one side in the direction of the optical axis is formed on an inner circumferential surface of a holder main body such as to project towards an inner side in a radial direction perpendicular to the optical axis direction. The pressing component is disposed at a position opposing the holding section in the optical axis direction with the optical component therebetween and formed such as to press the optical component housed within the holder from another side in the direction of the optical axis In the optical unit, a first contacting section allowing the holding section and the optical component adjacent to the holding section to come into contact with each other is formed in the holding section at a position opposing, in the optical axis direction, the optical component adjacent to the holding section. A second contacting section allowing the holding section and the optical component adjacent to the holding section to come into contact with each other is formed on the optical component adjacent to the holding section at a position opposing the holding section in the optical axis direction. One contacting section of the first and second contacting sections is formed angled in relation to the optical axis direction. The other contacting section of the first and second contacting sections is formed such as to come into contact with the one contacting section of the first and second contacting sections through point contact, linear contact, or surface contact. A third contacting section allowing the pressing component and the optical component adjacent to the pressing component to come into contact with each other is formed on the pressing component at a position opposing, in the optical axis direction, the optical component adjacent to the pressing component. A fourth contacting section allowing the pressing component and the optical component adjacent to the pressing component to come into contact with each other is formed on the optical component adjacent to the pressing component at a position opposing the pressing component in the optical axis direction One contacting section of the third and fourth contacting sections is formed angled in relation to the optical axis direction. The other contacting section of the third and fourth contacting sections is formed such as to come into contact with the one contacting section of the third and fourth contacting sections through point contact, linear contact, or surface contact. A gap section in the radial direction preventing the optical component from being affected by external stress from the holder when the optical component and the holder thermally expand is formed between an outer circumferential surface of the optical component and the inner circumferential surface of the holder. A gap section in the optical axis direction preventing the optical component disposed between the pressing component and the holding section from being affected by external stress such as that pressing the optical-component in the optical axis direction when the optical component, the pressing component, and the holder thermally expand is formed on at least one of a section between predetermined surfaces of the pressing component and the optical component adjacent to the pressing component opposing each other in the optical axis direction, and a section between predetermined surfaces of the holding section and the optical component adjacent to the holding section opposing each other in the optical axis direction.

The optical component disposed between the pressing component and the holding section refers to an optical component adjacent to the pressing component, an optical component adjacent to the holding section, or an optical component disposed between the optical component adjacent to the pressing component and the optical component adjacent to the holding section (this, however, is limited to when a configuration is used in which an optical component such as this is disposed).

In the first aspect of the present invention, the gap section in the radial direction formed between the outer circumferential surface of the optical component and the inner circumferential surface of the holder can prevent the optical component from being affected by external stress from the holder during thermal expansion, without requiring a special component.

In the present invention, the gap section in the optical axis direction formed between at least one of the pressing component and the optical component adjacent to the pressing component, and the holding section and the optical component adjacent to the holding section, can prevent the optical axis disposed between the pressing component and the holding component from being affected by external stress such as that pressing the optical component in the optical axis direction during thermal expansion, without requiring a special component. For example, when the gap section in the optical axis direction is formed between predetermined surfaces of the pressing component and the optical component adjacent to the pressing component, the optical component adjacent to the pressing component can be prevented from being affected by external stress from the pressing component during thermal expansion, without a special component being required. Furthermore, for example, when the gap section in the optical axis direction is formed between predetermined surfaces of the holding section and the optical component adjacent to the holding section, the optical component adjacent to the holding section can be prevented from being affected by external stress from the holding section during thermal expansion, without a special component being required.

As a result, changes in optical performance caused by thermal expansion can be sufficiently reduced. The number of components can be reduced. In addition, because of the reduction in the number of components, cost reduction and size reduction of a device can be achieved. Moreover, when the optical unit returns to its original dimensions before thermal expansion after thermal expansion is completed, the optical component adjacent to the pressing component can be stably held within the holder by the fourth contacting section formed on the optical component adjacent to the pressing component and the third contacting section formed or the pressing component coming into contact. Stable holding of the optical component such as this is ensured as a result of at least one contacting section of the third contacting section and the fourth contacting section being formed as the angled section. In the present invention, when the optical unit returns to its original dimensions before thermal expansion after thermal expansion is completed, the optical component adjacent to the holding section can be stably held within the holder by the second contacting section formed on the optical component adjacent to the holding section and the first contacting section formed on the holding section coming into contact. Stable holding of the optical component such as this is ensured as a result of at least one contacting section of the first contacting section and the second contacting section being formed as the angled section.

An optical unit according to a second aspect is the optical unit according to the first aspect in which the optical component adjacent to the holding section is formed from a material having a greater linear expansion coefficient than a material forming the holding section. The second contacting section formed on the optical component adjacent to the holding section is positioned further to the outer side in the radial direction than the first contacting section formed on the holding section.

In the second aspect of the present invention, the second contacting section formed on the optical component adjacent to the holding section, to which thermal expansion causes a relatively large amount of dimensional change, is disposed further on the outer side in the radial direction than the first contacting section formed on the holding section, to which thermal expansion causes a relatively small amount of dimensional change. As a result, the optical component adjacent to the holding section can be prevented from being affected by external stress from the holding section during thermal expansion. Therefore, changes in optical performance of the optical component adjacent to the holding section caused by thermal expansion can be sufficiently reduced, without the number of components being increased.

An optical element according to a third aspect is the optical element according to the second embodiment in which the first contacting section formed on the holding section and the second contacting section formed on the optical component adjacent to the holding section are both formed as an angled section at an angle in relation to the optical axis direction. The angled section formed on the optical component adjacent to the holding section and the angled section formed on the holding section are both formed having a shape angling inward in the radial direction towards the pressing component side in the optical axis direction.

In the third aspect of the present invention, when the angled section formed on the optical component adjacent to the holding section is positioned further to the outer side in the radial direction than the angled section formed on the holding section, the shape of the angled section can be a shape allowing the holding section to appropriately hold the optical component.

An optical unit according to a fourth aspect is the optical unit according to the first aspect in which the optical component adjacent to the holding section is formed from a material having a smaller linear expansion coefficient than a material forming the holding section. The second contacting section formed on the optical component adjacent to the holding section is positioned further to the inner side in the radial direction than the first contacting section formed on the holding section.

In the fourth aspect of the present invention, the second contacting section formed on the optical component adjacent to the holding section, to which thermal expansion causes a relatively small amount of dimensional change, is disposed further on the inner side in the radial direction than the first contacting section formed on the holding section, to which thermal expansion causes a relatively large amount of dimensional change. As a result, the optical component adjacent to the holding section can be prevented from being affected by external stress from the holding section during thermal expansion. Therefore, changes in optical performance of the optical component adjacent to the holding section caused by thermal expansion can be sufficiently reduced, without the number of components being increased.

An optical unit according to a fifth aspect is the optical unit according to the fourth aspect in which the first contacting section formed on the holding section and the second contacting section formed on the optical component adjacent to the holding section are both formed as an angled section at an angle in relation to the optical axis direction The angled section formed on the optical component adjacent to the holding section and the angled section formed on the holding section are both formed having a shape angling outward in the radial direction towards the pressing component side in the optical axis direction.

In the fifth aspect of the present invention, when the angled section formed on the optical component adjacent to the holding section is positioned further to the inner side in the radial direction than the angled section formed on the holding section, the shape of the angled section can be a shape allowing the holding section to appropriately hold the optical component.

An optical unit according to a sixth embodiment is the optical unit according to the first aspect in which the optical component adjacent to the pressing component is formed from a material having a greater linear expansion coefficient than a material forming the pressing component. The fourth contacting section formed on the optical component adjacent to the pressing component is positioned further to the outer side in the radial direction than the third contacting section formed on the pressing component.

In the sixth aspect of the present invention, the fourth contacting section formed on the optical component adjacent to the pressing component, to which thermal expansion causes a relatively large amount of dimensional change, is disposed further on the outer side in the radial direction than the third contacting section formed on the pressing component, to which thermal expansion causes a relatively small amount of dimensional change. As a result, the optical component adjacent to the pressing component can be prevented from being affected by external stress from the pressing component during thermal expansion. Therefore, changes in optical performance of the optical component adjacent to the pressing component caused by thermal expansion can be sufficiently reduced, without the number of components being increased.

An optical unit according to a seventh aspect is the optical unit according to the sixth aspect in which the third contacting section formed on the pressing component and the fourth contacting section formed on the optical component adjacent to the pressing component are both formed as an angled section at an angle in relation to the optical axis direction. The angled section formed on the optical component adjacent to the pressing component and the angled section formed on the pressing component are both formed having a shape angling inward in the radial direction towards the holding section side in the optical axis direction.

In the seventh aspect of the present invention, when the angled section formed on the optical component adjacent to the pressing component is positioned further to the outer side in the radial direction than the angled section formed on the pressing component, the shape of the angled section can be a shape allowing the pressing section to appropriately press the optical component.

An optical unit according to an eighth aspect is the optical unit according to the first aspect in which the optical component adjacent to the pressing component is formed from a material having a smaller linear expansion coefficient than a material forming the pressing component. The fourth contacting section formed on the optical component adjacent to the pressing component is positioned further to the inner side in the radial direction than the second contacting section formed on the pressing component.

In the eighth aspect of the present invention, the fourth contacting section formed on the optical component adjacent to the pressing component, to which thermal expansion causes a relatively small amount of dimensional change, is disposed further on the inner side in the radial direction than the third contacting section formed on the pressing component, to which thermal expansion causes a relatively large amount of dimensional change. As a result, the optical component adjacent to the pressing component can be prevented from being affected by external stress from the pressing component during thermal expansion. Therefore, changes in optical performance of the optical component adjacent to the pressing component caused by thermal expansion can be sufficiently reduced, without the number of components being increased.

An optical unit according to a ninth aspect is the optical unit according to the eighth aspect in which the third contacting section formed on the pressing component and the fourth contacting section formed on the optical component adjacent to the pressing component are both formed as an angled section at an angle in relation to the optical axis direction. The angled section formed on the optical component adjacent to the pressing component and the angled section formed on the pressing component are both formed having a shape angling outward in the radial direction towards the holding section side in the optical axis direction.

In the ninth aspect of the present invention, when the angled section formed on the optical component adjacent to the pressing component is positioned further to the inner side in the radial direction than the angled section formed on the pressing component, the shape of the angled section can be a shape allowing the pressing component to appropriately press the optical component.

An optical unit according to a tenth aspect is the optical unit according to the first aspect in which the angled section formed on at least one of the holding section and the optical component adjacent to the holding section and the angled section formed on at least one of the pressing component and the optical component adjacent to the pressing component are formed as a tapered surface.

In the tenth aspect of the present invention, because the angled section is formed as a tapered surface, the holding section can more appropriately hold the optical component and the pressing component can more appropriately press the optical component.

An optical unit according to an eleventh aspect is the optical unit according to the first aspect in which a plurality of optical components are housed within the holder such as to be overlapping in the optical axis direction. A fifth contacting section is formed on one optical component of two arbitrary optical components adjacent to each other in the optical axis direction, among the plurality of optical components, at a position opposing the other optical component of the two optical components in the optical axis direction. The fifth contacting section allows the two optical components to come into contact with each other. A sixth contacting section allowing the two optical components to come into contact with each other is formed on the other optical component of the two optical components at a position opposing the one optical component of the two optical components in the optical axis direction. One contacting section of the fifth and sixth contacting section is formed as an angled section at an angle in relation to the optical axis direction. The other contacting section of the fifth and sixth contacting section is formed as an angled section at an angle in relation to the optical axis direction or an angled section having a shape that comes into contact with the one contacting section of the fifth and sixth contacting sections through point contact, linear contact, or surface contact. A gap section in the optical axis direction preventing the two optical components from being mutually affected by external stress between the two optical components during thermal expansion is formed between predetermined surfaces of the two optical components opposing each other in the optical axis direction.

The two arbitrary optical components adjacent to each other in the optical axis direction do not prevent an instance in which two optical components allow respective angling sections to come into contact with each other while another optical component is interposed between the two optical components (the same applies hereafter).

In the eleventh aspect of the present invention, the gap section in the optical axis direction formed between the predetermined surfaces of the two optical components can prevent the two optical components from being mutually affected by external stress from the adjacent other optical component during thermal expansion, without requiring a special component. Therefore, changes in optical performance caused by thermal expansion can be sufficiently reduced. The number of components can be reduced. Moreover, when the optical unit returns to its original dimensions before thermal expansion after thermal expansion is completed, the two optical components can be stably held within the holder by the fifth contacting section and the sixth contacting section respectively formed on the two optical components coming into contact. Stable holding of the optical components such as this is ensured as a result of at least one contacting section of the fifth contacting section and the sixth contacting section being formed as the angled section.

An optical unit according to a twelfth aspect is the optical unit according to the eleventh aspect in which the one optical component of the two optical components is formed from a material having a greater linear expansion coefficient than a material forming the other optical component. The fifth contacting section formed on the one optical component is positioned further to the outer side in the radial direction than the sixth contacting section formed on the other optical component.

In the twelfth aspect of the present invention, the fifth contacting section formed on the one optical component, to which thermal expansion causes a relatively large amount of dimensional change, is disposed further on the outer side in the radial direction than the sixth contacting section formed on the other optical component, to which thermal expansion causes a relatively small amount of dimensional change. As a result, the two optical components can be prevented from being mutually affected by external stress from the adjacent other optical component during thermal expansion. Therefore, changes in optical performance of the two mutually adjacent optical components caused by thermal expansion can be sufficiently reduced, without the number of components being increased.

An optical unit according to a thirteenth aspect is the optical unit according to the twelfth aspect, in which the fifth and sixth contacting sections respectively formed on the two optical components are both formed as an angled section at an angle in relation to the optical axis direction In the thirteenth aspect of the present invention, when the optical unit returns to its original dimensions before thermal expansion after thermal expansion is completed, the two optical components can be more stably held within the holder by the angled sections respectively formed on the two optical components coming into contact.

An optical unit according to a fourteenth aspect is the optical unit according to the eleventh aspect in which the angled section formed on at least one of the two optical components is formed as a tapered surface.

In the fourteenth aspect of the present invention, because the angled section is a tapered surface, the two mutually adjacent optical components can be more stably held within the holder.

An optical unit according to a fifteenth aspect is the optical unit according to the first aspect in which the optical components include a lens.

In the fifteenth aspect of the present invention, when the gap section is formed between predetermined surfaces of the pressing component and the lens, the lens adjacent to the pressing component can be prevented from being affected by external stress during thermal expansion, without a special component being required. Therefore, changes in optical performance caused by thermal expansion can be sufficiently reduced. The number of components can be reduced. In the invention, when the gap section in the optical axis direction is formed between predetermined surfaces of the holding section and the optical component adjacent to the holding section, the optical component adjacent to the holding section can be prevented from being affected by external stress from the holding section during thermal expansion, without a special component being required.

An optical unit according to a sixteenth aspect is the optical unit according to the fifteenth aspect in which the optical unit is mounted on an imaging device.

In the sixteenth aspect of the present invention, an imaging device having excellent optical performance can be manufactured at a low cost.

EFFECT OF THE INVENTION

In the lens unit of the present invention, changes in optical performance caused by thermal expansion can be reduced and desired optical performance can be maintained, in addition to reduction in a number of components.

BRIEF DESCRIPTION OF THE DRAWINGS

FIG. 1 is a vertical cross-sectional view of a lens unit according to a first embodiment of the present invention;

FIG. 2 is a vertical cross-sectional view of a first variation example of the lens unit according to the first embodiment of the present invention;

FIG. 3 is a vertical cross-sectional view of a second variation example of the lens unit according to the first embodiment of the present invention;

FIG. 4 is a vertical cross-sectional view of a third variation example of the lens unit according to the first embodiment of the present invention;

FIG. 5 is a perspective view of a holder in the lens unit in FIG. 4;

FIG. 6 is a vertical cross-sectional view of a fourth variation example of the lens unit according to the first embodiment of the present invention;

FIG. 7 is a perspective view of a holder in the lens unit in FIG. 6;

FIG. 8 is a vertical cross-sectional view of a fifth variation example of the lens unit according to the first embodiment of the present invention;

FIG. 9 is a perspective view of a holder in the lens unit in FIG. 8;

FIG. 10 is a vertical cross-sectional view of a sixth variation example of the lens unit according to the first embodiment of the present invention;

FIG. 11 is a perspective view of a holder in the lens unit in FIG. 10;

FIG. 12 is a perspective view of a lens in the lens unit in FIG. 10;

FIG. 13 is a vertical cross-sectional view of a lens unit according to a second embodiment of the present invention;

FIG. 14 is a vertical cross-sectional view of a first variation example of the lens unit according to the second embodiment of the present invention;

FIG. 15 is a vertical cross-sectional view of a second variation example of the lens unit according to the second embodiment of the present invention;

FIG. 16 is a vertical cross-sectional view of a third variation example of the lens unit according to the second embodiment of the present invention;

FIG. 17 is a vertical cross-sectional view of a fourth variation example of the lens unit according to the second embodiment of the present invention;

FIG. 18 is a vertical cross-sectional view of a lens unit according to a third embodiment of the present invention;

FIG. 19 is a vertical cross-sectional view of a first variation example of the lens unit according to the third embodiment of the present invention;

FIG. 20 is a vertical cross-sectional view of a second variation example of the lens unit according to the third embodiment of the present invention;

FIG. 21 is a vertical cross-sectional view of a third variation example of the lens unit according to the third embodiment of the present invention; and FIG. 22 is a vertical cross-sectional view of a lens unit according to another embodiment of the present invention

DETAILED DESCRIPTION OF THE PREFERRED EMBODIMENT

First Embodiment

A first embodiment of a lens unit mounted on an imaging device serving as an optical unit of the present invention will be described with reference to FIG. 1 to FIG. 12.

As shown in FIG. 1, a lens unit 1 according to the first embodiment includes a single flat, circular lens 2 serving as an optical element. Largely classified, the lens 2 includes an optical function section 3 and a flange section 6. The optical function section 3 provides a function for forming an image of an object on a sensor surface of an image sensor element. The flange section 6 surrounds the optical function section 3.

A lens surface on an object side (referred to, hereinafter, as a first face 3a) and a lens surface on an image surface side (referred to, hereinafter, as a second face 3b) facing the first face 3a in an optical axis 5 direction are formed in the optical function section 3. The first face 3a is a lens surface that is concave on the object side. The second face 3b is a lens surface that is convex on the image surface side. However, the present invention is not limited to a configuration such as this. Various lens surface shapes can be used as required.

A lens 2 such as this is integrally formed using a heat-resistant thermosetting resin, such as a silicon-type resin or an epoxy-type resin.

The lens unit 1 according to the first embodiment has a roughly cylindrical holder 7 that houses the lens 2. The holder 7 is integrally formed using heat-resistant resin, such as a liquid crystal polymer (LCP) and polyphenylene sulfide (PPS).

According to the first embodiment, an inner circumferential surface of the holder 7 is divided into three inner circumferential surfaces 7a, 7b, and 7c. An inner circumferential surface 7a is on the object side. An inner circumferential surface 7b is on a center side, and the image surface side thereof is adjacent to the inner circumferential surface 7a on the object side. An inner circumferential surface 7c is on the image surface side, and the image surface side thereof is adjacent to the inner circumferential surface 7b on the center side. Among the three inner circumferential surfaces 7a, 7b, and 7c, the inner circumferential surface 7b on the center side has the smallest inner diameter. The inner circumferential surface 7a on the object side has the largest inner diameter. The inner diameter of the inner circumferential surface 7b on the center side is formed larger than an outer diameter of the lens 2. The present invention is not limited to a configuration such as this. The inner circumferential surfaces 7a, 7b, and 7c can be formed having a same diameter.

As shown in FIG. 1, a holding section 9 is formed in an end section (lower end section in FIG. 1) on the image surface side of the inner circumferential surface 7b on the center side of the holder 7. The holding section 9 is formed projecting inward in the radial direction, perpendicular to the optical axis 5 direction. The holding section 9 holds the lens 2 from the image surface side in the optical axis 5 direction (from below in FIG. 1).

More specifically, the holding section 9 includes a ring-shaped holding section outer piece 10 and a hollow, roughly truncated cone-shaped holding section inner piece 11. The holding section outer piece 10 extends inward in the radial direction from an end section on the image surface side of the inner circumferential surface 7b on the center side, such as to be perpendicular to the optical axis 5 direction. The holding section inner piece 11 extends at an angle towards the object side from an inner end section of the holding section outer piece 10 in the radial direction.

An end surface (an upper end surface in FIG. 1) 11a of the holding section inner piece 11 on the object side is formed having a ring shape perpendicular to the optical axis 5 direction (in other words, a surface normal is parallel with the optical axis 5). The end surface 11a serves as a reference surface for positioning the lens 2 when the lens 2 is housed in the holder 7 (referred to in the embodiment, hereinafter, as a holder side positioning reference surface 11a). An inner diameter of the holder side positioning reference surface 11a is formed slightly larger than an outer diameter of the second face 3b in the optical function section 3.

Moreover, a holder side first tapered surface 11b is formed on an outer circumferential surface of the holding section inner piece 11 adjacent to an outer end section of the holder side positioning reference surface 11a in the radial direction. The holder side first tapered surface 11b serves as an angled section that is an aspect of a first (contacting section. The holder side first tapered surface 11b is formed having an outer circumferential tapered shape angling inward in the radial direction towards the object side (pressing component 14 side, described hereafter) in the optical axis 5 direction.

Here, a tapered surface according to all embodiments of the present invention indicates a section on each angled surface, described hereafter, formed on a lens, a holder, and a pressing component that is in contact with another angled surface opposing each angled surface in the optical axis direction. Therefore, each angled surface may include, in addition to the tapered surface, an excess (extended) section (in other words, a section facing a stress preventing gap in the optical axis direction) connected to the tapered surface in a same planar shape. The excess section is involved in the formation of the stress preventing gap in the optical axis direction, described hereafter. Contact between tapered surfaces is conceptually equivalent to contact by surface contact.

For example, the above-described holder side first tapered surface 11b forms a portion of a holder side angled surface $11b_0$ shown in FIG. 1. In addition to the holder side first tapered surface 11b, the holder side angled surface $11b_0$ has an excess section 11b' connected to an outer end section of the holder side first tapered surface 11b in the radial direction. A stress preventing gap $d_{OA3}$ in the optical axis 5 direction, described hereafter, is formed by the excess section 11b'. The angled surface and the extended section are described in detail only in the first embodiment. Descriptions thereof are omitted in second and subsequent embodiments. However, in the second and subsequent embodiments as well, it is assumed that a surface involved with the formation of the stress preventing gap in the optical axis direction and connected to each tapered surface formed on the lens, the holder, and the pressing component in the drawings (FIG. 3 to FIG. 11) is shown as the excess section even when the section does not have a reference number. The excess section configures the tapered surface and the angled surface.

A holder side second tapered surface 11c is formed on the inner circumferential surface of the holding section inner piece 11 adjacent to the inner end section of the holder side positioning reference surface 11a in the radial direction. The holder side second tapered surface 11c is formed having an inner circumferential tapered shape angling inward in the radial direction towards the object side in the optical axis 5 direction.

The lens 2 according to the first embodiment is formed having a shape allowing the lens 2 to be held by the holding section 9 shaped as described above, in a state in which the lens 2 is placed on the holding section 9 such as to be adjacent to the holding section 9 in the optical axis 5 direction.

In other words, as shown in FIG. 1, a ring-shaped surface 6a perpendicular to the optical axis 5 direction is formed on a front surface of the flange section 6 on the image surface side, in a position adjacent to the second face 3b of the optical function section 3 on the outer side in the radial direction. The surface 6a serves as a positioning reference surface for the lens 2 (referred to, hereinafter, as a lens side positioning reference surface 6a) when the lens 2 is housed within the holder 7.

A lens side second tapered surface 6b is formed on the front surface of the flange section 6 on the image surface side, in a position adjacent to the lens side positioning reference surface 6a on the outer side in the radial direction. The lens side second tapered surface 6b serves as an angled section that is an aspect of a second contacting section. The lens side second tapered surface 6b is formed having an inner circumferential tapered shape angling inward in the radial direction towards the object side in the optical axis 5 direction. A taper angle of the lens side second tapered surface 6b is preferably the same as a taper angle of the holder side first tapered surface 11b.

The lens 2 formed having the above-described shape corresponding to the holding section 9 is placed on the holding section 9, such that positioning in the optical axis 5 direction of the lens 2 is performed by the lens side positioning reference surface 6a coming into contact with the holder side positioning reference surface 11a opposing the reference surface 6a in the optical axis 5 direction, at a position within the holder 7 that faces the inner circumferential surface 7b on the center side. Positioning in the radial direction is performed by the lens side second tapered surface 6b coming into contact with the holder side first tapered surface 11b opposing the tapered surface 6b in the optical axis 5 direction.

In this way, the lens 2 according to the first embodiment is held by the holding section 9 from the image surface side. In a state in which the lens 2 is held by the holding section 9 in this way, a ring-shaped surface (referred to, hereinafter as a flange outer circumferential edge lower end surface 6c) on the front surface of the flange section 6 on the image surface side adjacent to the lens side second tapered surface 6b on the outer side in the radial direction faces a front surface (upper surface in FIG. 1) 10a of the holding section outer piece 10 on the object side with the stress preventing gap $d_{OA3}$ in the optical axis 5 direction therebetween. The stress preventing gap $d_{OA3}$ is set taking into consideration a difference in linear expansion coefficients between the holder 7 and the lens 2. Therefore, the stress preventing gap $d_{OA3}$ provides a function for preventing the lens 2 from being affected by an external stress (external stress in the optical axis 5 direction) from the holding section 9 that presses the lens 2 in the optical axis 5 direction, when the lens unit 1 is exposed to a high temperature (for example, ambient temperature during reflow soldering) and the lens 2, the holder 7, and a pressing component 14 thermally expand.

The lens unit 1 according to the first embodiment also has a thick, ring-shaped pressing component 14 in a position opposing the holding section 9 in the optical axis 5 direction, with the lens 2 therebetween. In other words, the pressing component 14 is provided at a position on the inner side in the radial direction of the inner circumferential surface 7a on the object side of the holder 7. An outer diameter of the pressing component 14 is slightly larger than the inner diameter of the inner circumferential surface 7a or the object side of the holder 7. The pressing component 14 is formed having a size allowing the pressing component 14 to be pressed and fitted into the holder 7. The pressing component 14 is formed using a heat-resistant resin, such as a LCP, PPS, or a thermosetting resin.

As shown in FIG. 1, the pressing component 14 is configured by a ring-shaped pressing component outer piece 15 and a hollow, roughly truncated cone-shaped pressing component inner piece 16. The pressing component outer piece 15 is positioned within the holder 7, such as to be in contact with the inner circumferential surface 7a and perpendicular to the optical axis 5 direction. The pressing component inner piece 16 extends at an angle towards the image surface side from the inner end section of the pressing component outer piece 15 in the radial direction.

An end surface (lower end surface in FIG. 1) 16a of the pressing component inner piece 16 on the image surface side and a front surface (lower surface) 15a of the pressing component outer piece 15 on the image surface side are both formed into a ring shape perpendicular to the optical axis 5 direction. An inner diameter of the end surface 16a on the image surface side of the pressing component inner piece 16 is formed slightly smaller than the outer diameter of the first face 3a of the optical function section 3.

A pressing component side first tapered surface 16b is formed on an outer circumferential surface of the pressing component inner piece 16, positioned between the end surface 16a on the image surface side of the pressing component inner piece 16 and the front surface 15a on the image surface side of the pressing component outer piece 15. The pressing component side first tapered surface 16b serves as an angled section that is an aspect of a third contacting section. The pressing component side first tapered surface 16b is formed having an outer circumferential tapered shape angling inward in the radial direction towards the image surface side (holding section 9 side) in the optical axis 5 direction.

The pressing component side first tapered surface 16b forms a portion of a pressing component side angled surface $16b_0$ shown in FIG. 1. In addition to the pressing component side first tapered surface 16b, the pressing component side angled surface $16b_0$ has an excess section 16b' connected to an outer end section of the pressing component side first tapered surface 16b in the radial direction. A stress preventing gap $d_{OA1}$ in the optical axis 5 direction, described hereafter, is formed by the excess section 16b'.

A pressing component side second tapered surface 16c is formed on the inner circumferential surface of the pressing component inner piece 16. The pressing component side second tapered surface 16c is formed having an inner circumferential tapered shape angling inward in the radial direction towards the image surface side (holding section 9 side) in the optical axis 5 direction. The pressing component side second tapered surface 16c functions as a diaphragm restricting a range of light entering a lens 2 side from the object side.

The lens 2 according to the first embodiment is formed in relation to the pressing component 14 shaped as described above, such as to having a shape allowing the lens 2 within the holder 7 to be pressed from the object side by the pressing component 14.

In other words, as shown in FIG. 1, a ring-shaped surface 6d perpendicular to the optical axis 5 direction is formed on the front surface of the flange section 6 on the object side, in a position adjacent to the first face 3a of the optical function section 3 on the outer side in the radial direction. The surface 6d is a surface (referred to, hereinafter, as a first opposing surface 6d) opposing the end surface 16a on the image surface side of the pressing component inner piece 16, when the lens 2 is pressed by the pressing component 14.

A lens side first tapered surface 6e is formed on the front surface of the flange section 6 on the object side, at a position adjacent to the first opposing surface 6d on the outer side in the radial direction. The lens side first tapered surface 6e is formed having an inner circumferential tapered shape angling inward in the radial direction towards the image surface side in the optical axis 5 direction.

The lens side first tapered surface 6e forms a portion of a lens side angled surface $6e_0$ shown in FIG. 1. In addition to the lens side first tapered surface 6e, the lens side angled surface $6e_0$ has an excess section 6e' connected to an inner end section of the lens side first tapered surface 6e in the radial direction. A stress preventing gap $d_{OA2}$ in the optical axis 5 direction, described hereafter, is formed by the excess section 6e'.

A taper angle of the lens side first tapered surface 6e is preferably the same as a taper angle of the pressing component side first tapered surface 16b.

A ring-shaped surface 6f perpendicular to the optical axis 5 direction is formed on the front surface of the flange section 6 on the object side, in a position adjacent to the lens side first tapered surface 6e on the outer side in the radial direction. The surface 6f is a surface (referred to, hereinafter, as a second opposing surface 6f) opposing the front surface 15a on the image surface side of the pressing component outer piece 15, when the lens 2 is pressed by the pressing component 14.

The lens 2 formed in a shape corresponding to the above-described pressing component 14 is pressed within the holder 7 from the object side by the pressing component 14, in a state in which the pressing component side first tapered surface 16b opposing the lens side first tapered surface 6e in the optical 5 direction is in contact with the tapered surface 6e.

The pressing component 14 is fixed on to the inner circumferential surface 7a on the object side while still pressing the lens 2, by an adhesive, such as a thermosetting resin.

According to the first embodiment, stress preventing gaps dR1 and dR2 in the radial direction are formed between the outer circumferential surface of the lens 2 (specifically the outer circumferential surface of the flange section 6) and the inner circumferential surface 7a on the object side of the holder 7, and between the outer circumferential surface of the lens 2 and the inner circumferential surface 7b on the center side of the holder 7. The stress preventing gaps $d_{R1}$ and $d_{R2}$ prevent the lens 2 from being affected by external stress in the radial direction from the holder 7, when the lens unit 1 is exposed to a high temperature and the lens 2, the holder 7, and the pressing component 14 thermally expand. According to the first embodiment, a stress preventing gap $d_{R1}$ between the outer circumferential surface of the lens 2 and the inner circumferential surface 7a on the object side of the holder 7 is formed larger than a stress preventing gap $d_{R2}$ between the outer circumferential surface of the lens 2 and the inner circumferential surface 7b on the center side of the holder 7. The gaps are merely required to have dimensions sufficient for preventing the lens 2 from being affected by the external stress in the radial direction from the holder 7. $d_{R1}$ can equal $d_{R2}$.

According to the first embodiment, as a gap between predetermined surfaces of the pressing component 14 and the lens 2 opposing each other in the optical axis 5 direction, the stress preventing gap $d_{OA1}$ in the optical axis 5 direction (gap width is in the optical axis 5 direction) is formed between the front surface 15a of the pressing component outer piece 15 on the image surface side and the second opposing surface $6f$. The stress preventing gap $d_{OA1}$ prevents the lens 2 from being affected by external stress (external stress in the optical axis 5 direction) that presses the lens 2 in the optical axis 5 direction, when thermal expansion occurs.

According to the first embodiment, as a gap between predetermined surfaces of the pressing component 14 and the lens 2 opposing each other in the optical axis 5 direction, a stress preventing gap $d_{OA2}$ in the optical axis 5 direction is formed between the end surface 16a of the pressing component inner piece 16 on the image surface side and the first opposing surface 6d. The stress preventing gap $d_{OA2}$ prevents the lens 2 from being affected by external stress when thermal expansion occurs.

In addition to the above-described configuration, according to the first embodiment, the lens 2 is formed from a material having a greater linear expansion coefficient than a material forming the holding section 9 adjacent to the lens 2 on the image surface side in the optical axis 5 direction or, in other words, a material forming the holder 7. Moreover, the lens 2 is formed from a material having a greater linear expansion coefficient than a material forming the pressing component 14 adjacent to the lens 2 on the object side in the optical axis 5 direction.

The holder 7 and the pressing component 14 are preferably formed from a resin material having heat resistance, such as a LCP or PPS. The linear expansion coefficient of the LCP is about $56 \cdot 10^{-6}$. The lens 2 is preferably formed from a silicon-type or epoxy-type thermosetting resin having heat resistance. The linear expansion coefficient of silicon resin may be, for example, about $185 \cdot 10^{-6}$ at glass transition temperature 7 C or more and about $90 \cdot 10^{-6}$ at a temperature under the glass transition temperature.

The holder 7 and the pressing component 14 can be formed from materials having a same linear expansion coefficient.

Regarding the lens unit 1 according to the first embodiment, configured as described above, an optical module is formed in a modularization process within a manufacturing process for the imaging device. In the modularization process, an image sensor element (not shown) is attached to the end section of the holder 7 on the image surface side by an adhesive, such as a thermosetting resin. The image sensor element is electrically connected to a circuit board to which the lens unit 1 is assembled by reflow soldering.

In other words, the lens unit 1 according to the first embodiment is exposed to a high temperature environment caused by reflow soldering when being mounted on the circuit board. The lens 2, the pressing component 14, and the holder 7 may thermally expand in the optical axis direction and the radial direction as a result of heat caused by reflow soldering.

However, even in an instance such as this, because the stress preventing gaps $d_{R1}$ and $d_{R2}$ in the radial direction are formed between the outer circumferential surface of the lens 2 and the inner circumferential surfaces 7a and 7b of the holder 7, the lens 2 does not press against the inner circumferential surfaces 7a and 7b of the holder 7 during thermal expansion. The lens 2 can be prevented from being affected by the external stress in the radial direction from the holder 7 during thermal expansion.

Moreover, at this time, because the stress preventing gaps $d_{OA1}$ and $d_{OA2}$ in the optical axis 5 direction are formed between the pressing component 14 and the lens 2, the lens 2 does not press against the pressing component 14 during thermal expansion (pressing occurring here differs from the pressing of the lens 2 by the pressing component 14). The lens 2 can be prevented from being affected by the external stress in the optical axis 5 direction during thermal expansion.

Moreover, at this time, because the stress preventing gap $d_{OA3}$ in the optical axis 5 direction is formed between the holding section 9 and the lens 2, the lens 2 does not press against the holding section 9 during thermal expansion. The lens 2 can be prevented from being affected by the external stress in the optical axis 5 direction during thermal expansion.

The stress preventing gap $d_{OA3}$ is not necessarily required to be formed. A configuration in which the stress preventing gap $d_{OA3}$ is not formed can also be used. When the stress preventing gap $d_{OA3}$ is not used, the flange outer circumferential edge lower end surface 6c and the front surface 10c on the object side of the holding section outer piece 10 come into contact during thermal expansion, thereby pressing upward the entire lens 2 in the object direction. Even in this instance, if the stress preventing gaps $d_{OA1}$ and $d_{OA2}$ are designed such as to have sufficient dimensions (dimensions allowing thermal expansion in the optical axis 5 direction of a section between the flange outer circumferential edge lower end surface 6c and the second opposing surface 6f in the lens 2 and thermal expansion in the optical axis 5 direction of the holding section outer piece 10), the lens 2 can be prevented from pressing against the holding section 9 and the lens 2 can be prevented from pressing against the pressing component 14 during thermal expansion. Problems regarding external stress do not occur.

However, if a gap is formed to allow thermal expansion in the optical axis 5 direction of a section between the lens side positioning reference surface 6a and the flange outer circumferential edge lower end surface 6c in the lens 2 as the stress preventing gap $d_{OA3}$, the dimensions of the stress preventing gaps $d_{OA1}$ and $d_{OA2}$ can be minimized, thereby achieving a thinner lens unit 1.

According to the first embodiment, the lens 2 is formed from a material having a greater linear expansion coefficient than the material forming the pressing component 14. In addition, the lens side first tapered surface 6e is in contact with the pressing component side first tapered surface 16b on the outer side in the radial direction. Therefore, the lens 2 can thermally expand such that the lens side first tapered surface 6e separates from the pressing component side first tapered surface 16b outward in the radial direction. The thermal expansion of the lens 2 may be accompanied by sliding between the lens side first tapered surface 6e and the pressing component side first tapered surface 16b. However, unlike when pressing occurs, the sliding does not cause external stress to be applied to the lens 2.

In this way, the lens 2 can be prevented from pressing against the pressing component 14 during thermal expansion with more certainty, because the lens side first tapered surface 6e of the lens 2, to which thermal expansion causes relatively large amount of dimensional change, is disposed further on the outer side in the radial direction than the pressing component side first tapered surface 16b, to which thermal expansion causes a relatively small amount of dimensional change. As a result, the lens 2 can be more effectively prevented from being affected by the external stress in the optical axis 5 direction during thermal expansion.

Moreover, at this time, the lens is formed from a material having a greater linear expansion coefficient than the material forming the holder 7 (holding section 9). In addition, the lens side second tapered surface 6b is in contact with the holder side first tapered surface 11b on the outer side in the radial direction. Therefore, the lens 2 can be thermally expanded such that the lens side second tapered surface 6b separates from the holder side first tapered surface 11b outward in the radial direction. The thermal expansion of the lens 2 may be accompanied by sliding between the lens side second tapered surface 6b and the holder side first tapered surface 11b. However, unlike when pressing occurs, the sliding does not cause external stress to be applied to the lens 2.

In this way, the lens 2 can be prevented from pressing against the holdings section 9 of the holder 7 during thermal expansion with more certainty, because the lens side second tapered surface 6b of the lens 2, to which thermal expansion causes a relatively large amount of dimensional change, is disposed further on the outer side in the radial direction than the holder side first tapered surface 11b of the holder 7, to which thermal expansion causes a relatively small amount of dimensional change. As a result, the lens 2 can be more effectively prevented from being affected by the external stress from the holder 7 during thermal expansion.

When, after reflow soldering is completed while the lens 2 is being prevented from being affected by the external stress during thermal expansion in this way, the lens unit 1 is cooled to an ordinary operating environment temperature, the lens 2 can return to the same or similar dimensions as initial dimensions before reflow soldering (shrink). Initial optical performance can be maintained.

At this time, the lens 2 that has returned to its original dimensions is stably held within the holder 7, in a state in which the pressing component side first tapered surface 16b is in contact with the lens side first tapered surface 6e and the holder side first tapered surface 11b is in contact with the lens side second tapered surface 6b. Therefore, the lens 2 can return to its original position allowing the initial optical performance to the achieved.

First Variation Example of the First Embodiment

Next, a first variation example of the lens unit having a single-lens structure according to the first embodiment will be described with reference to FIG. 2, focusing on differences between the lens unit of the first variation example and the lens unit 1 shown in FIG. 1.

Sections having the same or similar basic configuration as those shown in FIG. 1 are described using the same reference numbers for convenience.

As shown in FIG. 2, main differences between a lens unit 20 of the first variation example and the lens unit 1 shown in FIG. 1 are orientations of each tapered surface, in as the lens side first tapered surface 6e, the lens side second tapered surface 6b, the holder side first tapered surface 11b, and the pressing component first tapered surface 16b, and magnitude correlation among the linear expansion coefficients of the materials respectively forming the lens the holder 7, and the pressing component 14.

In other words, the lens 2 of the first variation example is formed from a material having a smaller linear expansion coefficient that a material forming the pressing component 14. The lens side first tapered surface 6e (outer circumferential taper) of a lens 2 such as this is in contact with the pressing component side first tapered surface 16b (inner circumferential taper) in a state in which the lens side first tapered surface 6e is positioned further on the inner side in the radial direction than the pressing component side first tapered surface 16b of the pressing component 14. The lens side first tapered surface 6a and the pressing component side first tapered surface 16b of the first variation example are both formed having a shape angling outward in the radial direction towards the image surface side (holding section 9 side) in the optical axis 5 direction.

In the first variation example, the excess section 6e' of the lens side angled surface $6e_0$ is connected to the outer end section of the lens side first tapered surface 6e in the radial direction. The excess section 6e' forms the stress preventing gap $d_{OA1}$ in the optical axis 5 direction. The excess section 16b' of the pressing component side angled surface $16b_0$ is connected to the inner end section of the pressing component side first tapered surface 16b in the radial direction. The excess section 16b' forms the stress preventing gap $d_{OA2}$ in the optical axis 5 direction.

In accompaniment with surface shapes of the lens side first tapered surface 6e and the pressing component side first tapered surface 16b such as those described above, the first opposing surface 6d of the first variation example opposes the pressing component 14 with the stress preventing gap $d_{OA2}$ in the optical axis 5 direction therebetween, at a position equivalent to the end section of the lens side first tapered surface 6e on the object side (upper end surface in FIG. 2). The second opposing surface 6f opposes the pressing component 14 with the stress preventing gap $d_{OA1}$ in the optical axis 5 direction therebetween, at a position on the outer side in the radial direction of the lens side angled surface $6e_0$. Moreover, the surface of the pressing component 14 on the image surface side, including the above-described surface shape of the pressing component side first tapered surface 16b, is formed having a surface shape suitable for the surface shape of the lens 2 of the first variation example. In other words, the surface of the pressing component 14 on the image surface side is formed having a surface shape allowing the lens 2 to be suitably pressed.

The lens 2 of the first variation example is formed from a material having a smaller linear expansion coefficient than the material forming the holder 7 including the holding section 9. The lens side second tapered surface 6b (outer circumferential taper) of the lens 2 such as this is in contact with the holder side first tapered surface 11b (inner circumferential taper) in a state in which the lens side second tapered surface 6b is positioned further on the inner side in the radial direction than the holder side first tapered surface 11b. The lens side second tapered surface 6b and the holder side first tapered surface 11b are both formed having a shape angling outward in the radial direction towards the object side (pressing component 14 side) in the optical axis 5 direction.

In accompaniment with surface shapes of the lens side second tapered surface 6b and the holder side first tapered surface 11b such as those described above, the lens side positioning reference surface 6a of the first variation example is in contact with the holder side positioning reference surface 11a at a position equivalent to the end section (lower end section) of the lens side second tapered surface 6b on the image surface side. In the first variation example, as shown in FIG. 2, the lens side second tapered surface 6b forms a portion of a second lens side angled surface $6b_0$ opposing the above-described lens side angled surface $6e_0$ in the optical axis 5 direction. In addition to the lens side second tapered surface 6b, the second lens side angled surface $6b_0$ has an excess section 6b' connected to the outer end section of the lens side second tapered surface 6b in the radial direction. The excess section 6b' forms the stress preventing gap $d_{OA3}$ in the optical axis 5 direction. The flange outer circumferential edge lower end surface 6c faces the holding section 9 with the stress preventing gap $d_{OA3}$ in the optical axis 5 direction therebetween, at a position on the outer side in the radial direction of the second lens side angled surface $6b_0$. Moreover, the surface o the holding section 9 on the object side, including the above-described surface shape of the holder side first tapered surface 11b, is formed having a surface shape suitable for the surface shape of the lens 2 of the first variation example. In other words, the surface of the holding section 9 on the object side is formed having a surface shape allowing the lens 2 to be suitably held.

The lens 2 of the first variation example is held on the inner side of the inner circumferential surface 7b having the same diameter as the inner circumferential surface 7a of the holder 7 to which the pressing component 14 is fixed. A stress preventing gap $d_R$ in the radial direction that has uniform dimensions is formed between the inner circumferential surface 7b and the outer circumferential surface of the lens 2.

In the lens unit 20 of a variation example such as this, the stress preventing gap $d_R$ in the radial direction is formed between outer circumferential surface of the lens 2 and the inner circumferential surface 7b of the holder 7, similar to that shown in FIG. 1. Therefore, because the lens 2 can be prevented from pressing against the inner circumferential surface 7b of the holder 7 during thermal expansion when reflow soldering is performed, the lens 2 can be prevented from being affected by the external stress in the radial direction from the holder 7.

Because the stress preventing gaps $d_{OA1}$ and $d_{OA2}$ in the optical axis 5 direction are formed between the pressing component 14 and the lens 2 in the first variation example as well, the lens 2 does not press against the pressing component 14 during thermal expansion. The lens 2 can be prevented from being affected by the external stress in the optical axis 5 direction during thermal expansion.

Moreover, because the stress preventing gap $d_{OA3}$ in the optical axis 5 direction is formed between the holding section 9 and the lens 2 in the first variation example as well, the lens 2 does not press against the holding section during thermal expansion. The lens 2 can be prevented from being affected by the external stress in the optical axis 5 direction during thermal expansion.

In the first variation example, the lens 2 is formed from a material having a smaller linear expansion coefficient than the material forming the pressing component 14. In addition, the lens side first tapered surface 6e is in contact with the pressing component side first tapered surface 16b on the inner side in the radial direction. Therefore, the pressing component 14 can thermally expand such that the pressing component side first tapered surface 16b separates from the lens side first tapered surface 6e outward in the radial direction. The thermal expansion of the pressing component 14 may be accompanied by sliding between the pressing component side first tapered surface 16b and the lens side first tapered surface 6e. However, unlike when pressing occurs, the sliding does not cause external stress to be applied to the lens 2.

In this way, the pressing component 14 can be prevented from pressing against the lens 2 during thermal expansion with more certainty, because the lens side first tapered surface 6e of the lens 2, to which thermal expansion causes a relatively small amount of dimensional change, is disposed further on the inner side in the radial direction than the pressing component side first tapered surface 16b, to which thermal expansion causes a relatively large amount of dimensional change. As a result, the lens 2 can be more effectively prevented from being affected by the external stress in the optical axis 5 direction during thermal expansion.

Moreover, in the first variation example, the lens 2 is formed from a material having a smaller linear expansion coefficient than the material forming the holder 7. In addition, the lens side second tapered surface 6b is in contact with the holder side first tapered surface 11b on the inner side in the radial direction. Therefore, the holding section 9 can thermally expand such that the holder side first tapered surface 11b separates from the lens side second tapered surface 6b outward in the radial direction. The thermal expansion of the holding section 9 may be accompanied by sliding between the holder side first tapered surface 11b and the lens side second tapered surface 6b. However, unlike when pressing occurs, the sliding does not cause external stress to be applied to the lens 2.

In this way, the holding section 9 can be prevented from pressing against the lens 2 during thermal expansion with more certainty, because the lens side second tapered surface 6b of the lens 2, to which thermal expansion causes relatively small amount of dimensional change, is disposed further on the inner side in the radial direction than the holder side first tapered surface 11b, to which thermal expansion causes a relatively large amount of dimensional change. As a result, the lens 2 can be more effectively prevented from being affected by the external stress from the holder 7 during thermal expansion.

Other configurations and operational effects are similar to those of the lens unit 1 shown in FIG. 1. Explanations thereof are omitted.

Second Variation Example of the First Embodiment

Next, a second variation example of the lens unit having a single-lens structure according to the first embodiment will be described with reference to FIG. 3, focusing on differences between the lens unit of the second variation example and the lens unit 1 shown in FIG. 1.

Sections having the same or similar basic configuration as those shown in FIG. 1 are described using the same reference numbers for convenience.

As shown in FIG. 3, main differences between a lens unit 21 of the second variation example and the lens unit 1 shown in FIG. 1 are positions at which the stress preventing gap $d_{OA3}$ in the optical axis 5 direction between the holding section 9 and the lens 2, and the positioning reference surfaces are formed.

In other words, as shown in FIG. 3, the stress preventing gap $d_{OA3}$ in the optical axis 5 direction of the second variation example is formed between the end surface (upper-end surface in FIG. 3) 11a of the holding section inner piece 11 on the object side and a surface 6a on the front surface of the flange section 6 on the image surface side, adjacent to the second face 3b of the optical function section 3 on the outer side in the radial direction.

In the second variation example, an excess section 6b' is formed at a position adjacent to the lens side second tapered surface 6b on the inner side in the radial direction, in a same planar shape (outer circumferential tapered-shape) as the lens side second tapered surface 6b. The excess section 6b' forms the stress preventing gap $d_{OA3}$ in the optical axis 5. The excess section 6b', together with the lens side second tapered surface 6b, forms the second lens side angled surface $6b_0$.

As shown in FIG. 3, in the second variation example, a portion 10a on the front surface of the holding section outer piece 10 on the object side, adjacent to the holder side first tapered surface 11b on the outer side in the radial direction serves as the holder side positioning reference surface. A portion 6c on the front surface of the flange section 6 on the image surface side, adjacent to the lens side second tapered surface 6b on the outer side in the radial direction serves as the lens side positioning reference surface. The lens 2 is placed on the holding section 9 and held in a state in which positioning in the optical axis 5 direction is performed by the lens side positioning reference surface 6c coming into contact with the holder side positioning reference surface 10a.

As in the lens unit 1 shown in FIG. 1, because the stress preventing gap $d_{OA3}$ in the optical axis 5 direction is formed between the holding section 9 and the lens 2 in the lens unit 21 of the second variation example as well, the lens 2 does not press against the holding section 9 during thermal expansion. The lens 2 can be prevented from being affected by the external stress in the optical axis 5 direction during thermal expansion.

Other configurations and operational effects are similar to those of the lens unit 1 shown in FIG. 1. Explanations thereof are omitted.

Third Variation Example of the First Embodiment

Next, a third variation example of the lens unit having a single-lens structure according to the first embodiment will be described with reference to FIG. 4 and FIG. 5.

The lens unit of the third variation example has a lens configuration that is similar to that of the second variation example shown in FIG. 3. Therefore, the lens unit of the third variation example will be described focusing on differences between the lens unit of the third variation example and the lens unit of the second variation example.

Sections having the same or similar basic configuration as those shown in FIG. 3 are described using the same reference numbers for convenience.

As shown in FIG. 4 and FIG. 5, main differences between a lens unit 65 of the third variation example and the lens unit 21 of the second variation example are a specific configuration of the first contacting section formed in the holding section 9 and a specific configuration of the third contacting section formed in the pressing component 14.

In other words, as shown in FIG. 4 and FIG. 5, the lens unit 65 of the third variation example has three holder side projections 67 at positions on the holder side angled surface $11b_0$ of the holding section 9 opposing the second lens side angled surface $6b_0$. The holder side projections 67 are an aspect of the first contacting section and are formed having the same shape. Each holder side projection 67 is formed evenly spaced in the circumferential direction. More specifically, an upper end surface of each holder side projection 67 is formed flat along a direction perpendicular to the optical axis 5. The planar shape is formed into a rough triangle, in which a circumferential direction width becomes narrow towards the outer side in the radial direction and a peak is formed on the outer end section in the radial direction.

The outer end section in the radial direction on the upper end surface of the holder side projection 67 comes into contact, through point contact, with the second lens side angled surface $6b_0$ serving as an angled section of the third variation example. Four or more holder side projections 67 can be provided as required.

Moreover, as shown in FIG. 4, the lens unit 65 of the third variation example has a plurality of pressing component side projections 68 (not shown) at positions on the pressing component side angled surface $16b_0$ of the pressing component 14 opposing the lens side angled surface $6e_0$ in the optical axis 5 direction. The pressing component side projections 68 are an aspect of the third contacting section and are formed having the same shape. Each pressing component side projection 68 is formed evenly spaced in the circumferential direction. More specifically, a lower end surface of each pressing component side projection 68 is formed flat along a direction perpendicular to the optical axis 5. The planar shape is formed into a rough triangle, in which a circumferential direction width becomes narrow towards the outer side in the radial direction and a peak is formed on the outer end section in the radial direction. The pressing component side projection 68 is formed having a shape similar to that of the holder side projection 67.

The outer end section in the radial direction on the lower end surface of the pressing component side projection 68 comes into contact, through point contact, with the lens side angled surface $6e_0$ serving as an angled section of the third variation example.

In the lens unit 65 of the third variation example formed as described above as well, the lens 2 that has returned to its original dimensions after thermal expansion can be stably held within the holder 7, in a state in which the pressing component side projections 68 are in contact with the lens side angled surface $6e_0$ and the holder side projections 67 are in contact with the second lens side angled surface $6b_0$.

Other configurations and operational effects are similar to those of the lens unit 21 shown in FIG. 3. Explanations thereof are omitted.

Fourth Variation Example of the First Embodiment

Next, a fourth variation example of the lens unit having a single-lens structure according to the first embodiment will be described with reference to FIG. 6 and FIG. 7.

Like the lens unit of the third variation example, the lens unit of the fourth variation example has a lens configuration that is similar to that of the second variation example shown in FIG. 3. Therefore, the lens unit of the fourth variation example will also be described focusing on differences between the lens unit of the fourth variation example and the lens unit of the second variation example.

Sections having the same or similar basic configuration as those shown in FIG. 3 are described using the same reference numbers for convenience.

As shown in FIG. 6 and FIG. 7, main differences between a lens unit 70 of the fourth variation example and the lens unit 21 of the second variation example are a specific configuration of the first contacting section formed in the holding section 9 and a specific configuration of the third contacting section formed in the pressing component 14.

In other words, as shown in FIG. 6 and FIG. 7, the lens unit 70 of the fourth variation example has three holder side hemispherical convex sections 71 at positions on the holder side angled surface $11b_0$ of the holding section 9 opposing the second lens side angled surface $6b_0$. The holder side hemispherical convex sections 71 are an aspect of the first contacting section and are formed having the same shape Each holder side hemispherical convex section 71 is formed evenly spaced in the circumferential direction. The front surface of the holder side hemispherical convex section 71 is formed into a hemispherical curved surface.

The holder side hemispherical convex section 71 comes into contact, through point contact, with the second lens side angled surface $6b_0$ serving as an angled section of the fourth variation example.

Moreover, as shown in FIG. 7, the lens unit 70 of the fourth variation example has a plurality of pressing component side convex sections 72 (not shown) at positions on the pressing component side angled surface $16b_0$ of the pressing component 14 opposing the lens side angled surface $6e_0$. The pressing component side convex sections 72 are an aspect of the third contacting section and are formed having the same shape. Each pressing component side convex section 72 is formed evenly spaced in the circumferential direction. Like the holder side hemispherical convex section 71, the front surface of the pressing component side convex section 72 is formed into a hemispherical curved surface.

The pressing component side convex section 72 comes into contact, through point contact, with the lens side angled surface $6e_0$ serving as an angled section of the fourth variation example.

In the lens unit 70 of the fourth variation example formed as described above as well, the lens 2 that has returned to its original dimensions after thermal expansion can be stably held within the holder 7, in a state in which the pressing component side convex sections 72 are in contact with the lens side angled surface $6e_0$ and the holder side hemispherical convex sections 71 are in contact with the second lens side angled surface $6b_0$.

Other configurations and operational effects are similar to those of the lens unit 21 shown in FIG. 3. Explanations thereof are omitted.

Fifth Variation Example of the First Embodiment

Next, a fifth variation example of the lens unit having a single-lens structure according to the first embodiment will be described with reference to FIG. 8 and FIG. 9.

Like the lens units of the third variation example and the fourth variation example, the lens unit of the fifth variation example has a lens configuration that is similar to that of the second variation example shown in FIG. 3. Therefore, the lens unit of the fifth variation example will also be described focusing on differences between the lens unit of the fifth variation example and the lens unit of the second variation example.

Sections having the same or similar basic configuration as those shown in FIG. 3 are described using the same reference numbers for convenience.

As shown in FIG. 8 and FIG. 9, main differences between a lens unit 74 of the fifth variation example and the lens unit 21 of the second variation example are a specific configuration of the first contacting section formed in the holding section 9 and a specific configuration of the third contacting section formed in the pressing component 14.

In other words, as shown in FIG. 8 and FIG. 9, the lens unit 74 of the fifth variation example has three holder side projections 75 at positions on the holder side angled surface $11b_0$ of the holding section 9 opposing the second lens side angled surface $6b_0$. The holder side projections 75 are an aspect of the first contacting section and are formed having the same shape. Each holder side projection 67 is formed evenly spaced in the circumferential direction.

More specifically, an upper end surface of each holder side projection 75 is formed flat along a direction perpendicular to the optical axis 5. The planar shape is formed into a rough triangle, in which a circumferential direction width becomes narrow towards the outer side in the radial direction and a peak is formed on the outer end section in the radial direction. Furthermore, a linear, angled edge line 75a is formed on the upper end surface of each holder side projection 75, from the outer end section in the radial direction to the front surface 10a of the holding section outer piece 10 on the object side. An angle of the angled edge line 75a (tilted angle) to the optical axis 5 is similar to the angle of the holder side angled surface $11b_0$.

The angled edge line 75a of the holder side projection 75 comes into contact, through linear contact, with the second lens side angled surface $6b_0$ serving as an angled section of the fifth variation example.

Moreover, as shown in FIG. 8, the lens unit 74 of the fifth variation example has a plurality of pressing component side projections 76 (only one projection is shown in FIG. 8) at positions on the pressing component side angled surface $16b_0$ of the pressing component 14 opposing the lens side angled surface $6e_0$ direction. The pressing component side projections 76 are an aspect of the third contacting section and are formed having the same shape. Each pressing component side projection 76 is formed evenly spaced in the circumferential direction.

More specifically, a lower end surface of each pressing component side projection 76 is formed flat along a direction perpendicular to the optical axis 5. The planar shape is formed into a rough triangle, in which a circumferential direction width becomes narrow towards the outer side in the radial direction and a peak is formed on the outer end section in the radial direction. Furthermore, a linear, angled edge line 76a is formed on the lower end surface of each pressing component side projection 76, from the outer end section in the radial direction to the front surface 15a of the pressing component outer piece 15 on the image surface side. An angle of the angled edge line 76a (tilted angle) to the optical axis 5 is similar to the angle of the pressing component side angled surface $16b_0$.

The angled edge line 76a of the pressing component side projection 76 comes into contact, through linear contact with the lens side angled surface $6e_0$ serving as an angled section of the fifth variation example.

In the lens unit 74 of the fifth variation example formed as described above as well, the lens 2 that has returned to its original dimensions after thermal expansion can be stably held within the holder 7, in a state in which the pressing component side projections 76 are in contact with the lens side angled surface $6e_0$ and the holder side projections 75 are in contact with the second lens side angled surface $6b_0$.

Other configurations and operational effects are similar to those of the lens unit 21 shown in FIG. 3. Explanations thereof are omitted.

Sixth Variation Example of the First Embodiment

Next, a sixth variation example of the lens unit having a single-lens structure according to the first embodiment will be described with reference to FIG. 10 to FIG. 12.

The lens unit of the sixth variation example will also be described focusing on differences between the lens unit on the sixth variation example and the lens unit of the second variation example, for convenience.

Sections having the same or similar basic configuration as those shown in FIG. 3 are described using the same reference numbers for convenience.

As shown in FIG. 10 to FIG. 12, main differences between a lens unit 78 of the sixth variation example and the lens unit 21 of the second variation example are specific configurations of the first to fourth contacting sections.

In other words, as shown in FIG. 10 and FIG. 11, the lens unit 78 of the sixth variation example has a holder side ring-shaped convex section 79 on the inner end section of the holding section 9 in the radial direction. The holder side ring-shaped convex section 79 is an aspect of the first contacting section and has a predetermined thickness. An upper end surface of the holder side ring-shaped convex section 79 projects further to the object side (upwards) than the front surface 10a of the holding section outer piece 10 on the object side. An outer circumferential end section 79a of the upper end surface is formed into a circle.

On the other hand, as shown in FIG. 12, three second projections 80 are formed at positions on the front surface of the flange section 6 on the image surface side, opposing the holder side ring-shaped convex section 79. The second projections 80 serve as angled sections that are an aspect on the second contacting section. The second projections 80 are formed evenly spaced in the circumferential direction.

Each second projection 80 has a linear, angled edge line 80a on the inner end section in the radial direction. The angled edge line 80a angles inward in the radial direction towards the object side in the optical axis 5 direction. The angled edge line 80a and the outer circumferential end section 79a of the holder side ring-shaped convex section 79 come into contact through point contact.

The lens unit 78 of the sixth variation example has a pressing component side ring-shaped convex section 82 on the front surface of the pressing component 14 on the image surface side, at a position equivalent to a border between the pressing component outer piece 15 and the pressing component inner piece 16. The pressing component side ring-shaped convex section 82 is an aspect of the third contacting section and has a predetermined thickness. An outer circumferential end section 82a on the lower end surface of the pressing component side ring-shaped convex section 82 is formed into a circle.

On the other hand, a plurality of first projections 84 (only one projection is shown in FIG. 10) are formed at positions on the front surface of the flange section 6 on the object side, opposing the pressing component ring-shaped convex section 82. The first projections 84 serve as angled sections that are an aspect of the fourth contacting section. The first projections 84 are formed evenly spaced in the circumferential direction.

Each first projection 84 has a linear, angled edge line 84a on the inner end section in the radial direction. The angled edge line 84a angles outward in the radial direction towards the object side in the optical axis 5 direction. The angled edge line 84a and the outer circumferential end section 82a of the pressing component side ring-shaped convex section 79 come into contact through point contact.

In the lens unit 78 of the sixth variation example formed as described above as well, the lens 2 that has returned to its original dimensions after thermal expansion can be stably held within the holder 7, in a state in which the pressing component side ring-shaped convex section 82 is in contact with the first projections 84 and the holder side ring-shaped convex section 79 is in contact with the second projections 80.

Other configurations and operational effects are similar to those of the lens unit 21 shown in FIG. 3. Explanations thereof are omitted. At least three projections and convex sections 67, 68, 71, 72, 75, 76, 80, and 84 of the third variation example to the sixth variation example according to the first embodiment are respectively formed to allow the lens 2 to be stably held.

Second Embodiment

Next, a lens unit according to a second embodiment serving as the optical unit of the present invention will be described with reference to FIG. 13 to FIG. 17, focusing on differences between the lens unit according to the second embodiment and the lens unit 1 according to the first embodiment.

Sections having the same or similar basic configuration as those in lens unit 1 according to the first embodiment are described using the same reference numbers for convenience.

As shown in FIG. 13, a main difference between a lens unit 22 according to the second embodiment and the lens unit 1 according to the first embodiment is a number of lenses housed within the holder 7.

In other words, according to the second embodiment, two lenses 2A and 2B are housed within the holder 7 such as to overlap with each other (be adjacent to each other) in the optical axis 5 direction. The two lenses 2A and 2B serve as two optical components and include a lens on the object side (referred to, hereinafter, as a first lens 2A) and a lens on the image surface side (referred to, hereinafter, as a second lens 2B). In FIG. 13, the first lens 2A is a meniscus lens having a positive power whose convex surface faces the object side. The second lens 2B is a meniscus lens having a positive power whose convex surface faces the image surface side. However, other lens shapes can also be used.

As shown in FIG. 13, according to the second embodiment, a positioning reference surface for the second lens 2B (referred to, hereinafter, as a holder side positioning reference surface 23) is formed on the front surface 10a of the holding section outer piece 10 on the object side, such as to be perpendicular to the optical axis 5 direction. On the other hand, the second lens 2B has a second lens side second positioning reference surface 24 at a position on the front surface of a flange section 6B on the image surface side, opposing the holder side positioning reference surface 23 on the object side in the optical axis direction. The second lens 2B is held on the holding section 9 in a state in which the second lens 2B is positioned by the second lens side second positioning reference surface 24 being in contact with the holder side positioning reference surface 23.

Moreover, the second lens 2B has a inner circumferential tapered-shaped second lens side second tapered surface 25 formed on the front surface of the flange section 6B on the image surface side, at a position opposing the holder side first tapered surface 11b on the object side in the optical axis 5 direction and adjacent to the second lens side second positioning reference surface 24 on the inner side in the radial direction. The second lens side second tapered surface 25 serves as an angled section (an aspect of the second contacting section). A surface shape of the second lens side second tapered surface 25 is formed such as to angle inward in the radial direction towards the object side in the optical axis 5 direction, similar to the holder side first tapered surface 11b. In a state in which the second lens 2B is held on the holding section 9, the second lens side second tapered surface 25 comes into contact with the holder side first tapered surface 11b from the object side in the optical axis 5 direction and the outer side in the radial direction.

According to the second embodiment, in a state in which the second lens 2B is held on the holding section 9, the end surface 11a of the holding section inner piece 11 on the object side faces the front surface of the flange section 6B of the second lens 2B on the image surface side such that a predetermined space in the optical axis 5 direction is provided. The space can be provided as required.

On the other hand, the first lens 2A has an outer circumferential tapered-shaped first lens side first tapered surface 26 formed on the front surface of a flange section 6A on the object side; at a position opposing the pressing component side first tapered surface 16b on the image surface side in the optical axis 5 direction. The first lens side first tapered surface 26 serves as an angled section (an aspect of the fourth contacting section). A surface shape of the first lens side first tapered surface 26 is formed such as to angle inward in the radial direction towards the image surface side in the optical axis 5 direction, similar to the pressing component side first tapered surface 16b. The first lens 2A is pressed by the pressing component 14 in a state in which the pressing component side first tapered surface 16b comes into contact with the first lens side first tapered surface 26 from the object side in the optical axis 5 direction and the inner side in the radial direction.

The first lens 2A has a ring-shaped second opposing surface 6f that is perpendicular to the optical axis 5 direction. The second opposing surface 6f is formed on the front surface of the flange section 6A on the object side, at a position adjacent to the first lens side first tapered surface 26 on the outer side in the radial direction and opposing the front surface 15a of the pressing component outer piece 15 on the image surface side, on the image surface side in the optical axis 5 direction. The second opposing surface 6f opposes the front surface 15a of the pressing component outer piece 15 on the image surface side with the stress preventing gap $d_{OA1}$ in the optical axis 5 direction therebetween, in a state in which the first lens 2A is pressed by the pressing component 14.

Moreover, the first lens 2A has a ring-shaped first opposing surface 6d that is perpendicular to the optical axis 5 direction. The first opposing surface 6d is formed on the front surface of the flange section 6A on the object side, at a position near the inner side of the first lens side first tapered surface 26 in the radial direction and opposing the end surface 16a of the pressing component inner piece 16 on the image surface side, on the image surface side in the optical axis 5 direction. The first opposing surface 6d opposes the end surface 16a of the pressing component inner piece 16 on the image surface side with the stress preventing gap $d_{OA2}$ in the optical axis 5 direction therebetween, in a state in which the first lens 2A is pressed by the pressing component 14.

Moreover, according to the second embodiment, the first lens 2A has a ring-shaped first lens side positioning reference surface 28 that is perpendicular to the optical axis 5 direction. The first lens side positioning reference surface 28 is formed on the front surface of the flange section 6A on the image surface side, at a position adjacent to a lens surface 3A on the outer side in the radial direction and opposing the first opposing surface 6d with a flange thickness therebetween. On the other hand, the second lens 2B has a second lens side first positioning reference surface 29 formed at a position adjacent to a lens surface 3B on the object side, on the outer side in the radial direction and opposing the first lens side positioning reference surface 28 on the front surface of the flange section 6B on the object side, on the image surface side in the optical axis 5 direction. The first lens 2A is placed on the second lens 2B and held in a state in which in which positioning is performed by the first lens side positioning reference surface 28 coming into contact with the second lens side first positioning reference surface 29.

Moreover, according to the second embodiment, the first lens 2A has a first lens side second tapered surface 3B formed on the front surface of the flange section 6A on the image surface side, at a position adjacent to the first lens side positioning reference surface 28 on the outer side in the radial direction and opposed to the first lens side first tapered surface 26 with the flange thickness therebetween. The first lens side second tapered surface 31 serves as an angled section that is an aspect of a fifth contacting section. The first lens side second tapered surface 31 is formed having an outer circumferential tapered shape that angles inward in the radial direction towards the image surface side in the optical axis 5 direction. On the other hand, the second lens 2B has a second lens side first tapered surface 32 formed on the front surface of the flange section 6B on the object side, at a position adjacent to the second lens side first positioning reference surface 29 on the outer side in the radial direction and opposing the first lens side second tapered surface 31 on the image surface side in the optical axis 5 direction. The second lens side first tapered surface 32 serves as an angled section that is an aspect of a sixth contacting section. The second lens side first tapered surface 32 formed having an inner circumferential tapered shape that angles inward in the radial direction towards the image surface side in the optical axis 5 direction. In a state in which the first lens 2A is held on the second lens 2B, the first lens side second tapered surface 31 comes into contact with the second lens side first tapered surface 32 from the object side in the optical axis 5 direction and the inner side in the radial direction.

Moreover, according to the second embodiment, the second lens 2B has a ring-shaped flange outer circumferential edge upper end surface 33 that is perpendicular to the optical axis 5 direction. The flange outer circumferential edge upper end surface 33 is formed on the front surface of the flange section 6B on the object side, at a position adjacent to the second lens side first tapered surface 32 on the outer side in the radial direction. The flange outer circumferential edge upper end surface 33 opposes a section on the front surface on the image surface side of the flange section 6A on the first lens 2A positioned on the outer side of the first lens side second tapered surface 31 in the radial direction, with the stress preventing gap $d_{OA3}$ in the optical axis 5 direction therebetween.

According to the second embodiment, stress preventing gaps $d_{R1}$, $d_{R2}$ and $d_{R3}$ in the radial direction are respectively formed between the outer circumferential surface of the first lens 2A and the inner circumferential surface 7a on the object side of the holder 7, between the outer circumferential surface of the first lens 2A and the inner circumferential surface 7b on the center side of the holder and between the outer circumferential surface of the second lens 2B and the inner circumferential surface 7b on the center side of the holder 7. The stress preventing gaps $d_{R1}$, $d_{R2}$, and $d_{R3}$ have different dimensions.

According to the second embodiment, the second lens 2B is formed from a material having a greater linear expansion coefficient than the material forming the first lens 2A. The first lens 2A is formed from a material having a greater linear expansion coefficient than the materials forming the pressing component 14 and the holder 7.

Like the lens unit according to the first embodiment, because the stress preventing gaps $d_{R1}$, $d_{R2}$, and $d_{R3}$ in the radial direction are formed between the outer circumferential surfaces of the lenses 2A and 2B and the inner circumferential surfaces 7a and 7b of the holder 7 in the lens unit 22 according to the second embodiment, the lenses 2A and 2B can be prevented from pressing against the inner circumferential surfaces 7a and 7b of the holder 7 during thermal expansion of the lens unit 22 when reflow soldering is performed. The lenses 2A and 2B can be prevented from being affected by the external stress in the radial direction from the holder 7.

According to the second embodiment, because the stress preventing gaps $d_{OA1}$ and $d_{OA2}$ in the optical axis 5 direction are formed between the pressing component 14 and the first lens 2A, the first lens 2A does not press against the pressing component 14 during thermal expansion. The first lens 2A can be prevented from being affected by the external stress in the optical axis 5 direction.

According to the second embodiment, because the stress preventing gap $d_{OA3}$ in the optical axis 5 direction is formed between the first lens 2A and the second lens 2B, the second lens 2B does not press against the first lens 2A during thermal expansion. The first lens 2A and the second lens 2B can be prevented from being mutually affected by the external stress in the optical axis 5 direction between the first lens 2A and the second lens 2B.

According to the second embodiment, the second lens 2B is formed from a material having a greater linear expansion coefficient than the material forming the first lens 2A. In addition, the second lens side first tapered surface 32 comes into contact with the first lens side second tapered surface 31 from the outer side in the radial direction. Therefore, the second lens 2B can thermally expand such that the second lens side first tapered surface 32 separates from the first lens side second tapered surface 31 outward in the radial direction. The thermal expansion of the second lens 2B may be accompanied by sliding between the second lens side first tapered surface 32 and the first lens side second tapered surface 31. However, unlike when pressing occurs, the sliding does not cause external stress. As a result, the first lens 2A and the second lens 2B can be more effectively prevented from being mutually affected by external stress between the first lens 2A and the second lens 2B during thermal expansion.

According to the second embodiment, the first lens 2A is formed from a material having a greater linear expansion coefficient than the material forming the pressing component 14. In addition, the first lens side first tapered surface 26 comes into contact with the pressing component side first tapered surface 16b from the outer side in the radial direction. Therefore, the first lens 2A can thermally expand such that the first lens side first tapered surface 26 separates from the pressing component side first tapered surface 16b outward in the radial direction. The thermal expansion of the first lens 2A may be accompanied by sliding between the first lens side first tapered surface 26 and the pressing component first tapered surface 16b. However, unlike when pressing occurs, the sliding does not cause external stress. As a result, the first lens 2A can be more effectively prevented from being affected by the external stress from the pressing component 14 during thermal expansion.

Moreover, according to the second embodiment, the second lens 2B is formed from a material having a greater linear expansion coefficient than the material forming the holder 7 including the holding section 9. In addition, the second lens side second tapered surface 25 comes into contact with the holder side first tapered surface 11b from the outer side in the radial direction. Therefore, the second lens 2B can thermally expand such that the second lens side second tapered surface 25 separates from the holder side first tapered surface 11b outward in the radial direction. The thermal expansion of the second lens 2B may be accompanied by sliding between the second lens side second tapered surface 25 and the holder side first tapered surface 11b. However, unlike when pressing occurs, the sliding does not cause external stress. As a result, the second lens 2B can be more effectively prevented from being affected by the external stress in the optical axis 5 direction during thermal expansion.

First Variation Example of the Second Embodiment

Next, FIG. 14 shows a preferred configuration of an instance in which a magnitude correlation between the linear expansion coefficients of the material forming the first lens 2A and the material forming the second lens 2B is a reverse of that of the lens unit 22 in FIG. 13, as a first variation example of the lens unit 22 having a two-lens structure according to the second embodiment, shown in FIG. 13.

In other words, in a lens unit 35 according to the first variation example, the first lens 2A is formed from a material having a greater linear expansion coefficient than the material forming the second lens 2B.

In accompaniment, in the first variation example, as shown in FIG. 14, the first lens side second tapered surface 31 comes into contact with the second lens side first tapered surface 32 from the outer side in the radial direction. More specifically, the first lens side second tapered surface 31 of the first variation example is formed having an inner circumferential tapered shape that angles inward in the radial direction towards the object side in the optical axis 5 direction. On the other hand, the second lens side first tapered surface 32 of the first variation example is formed having an outer circumferential tapered shape that angles inward in the radial direction towards the object side in the optical axis 5 direction.

In accompaniment with a tapered shape such as this, in the first variation example, the first lens side positioning reference surface 28 is formed at a position adjacent to the first lens side second tapered surface 31 on the outer side in the radial direction. In the first variation example, the second lens side first positioning reference surface 29 opposing the first lens side positioning reference surface 28 on the image surface side in the optical axis 5 direction is formed at a position adjacent to the second lens side first tapered surface 32 on the outer side in the radial direction. Furthermore, in the first variation example, the stress preventing gap $d_{OA3}$ in the optical axis 5 direction between the first lens 2A and the second lens 2B is formed at a position on the inner side of the tapered surfaces 31 and 32 in the radial direction and on the outer side of the lens surfaces 3A and 3B in the radial direction.

In the lens unit 35 of the first variation example, configured as described above, the first lens 2A is formed from a material having a greater linear expansion coefficient than the material forming the second lens 2B. In addition, the first lens side second tapered surface 31 comes into contact with the second lens side first tapered surface 32 from the outer side in the radial direction. As a result, the first lens 2A can thermally expand such that the first lens side second tapered surface 31 separates from the second lens side first tapered surface 32 outward in the radial direction. The thermal expansion of the first lens 2A may be accompanied by sliding between the first lens side second tapered surface 31 and the second lens side first tapered surface 32. However, unlike when pressing occurs, the sliding does not cause external stress. As a result, the first lens 2A and the second lens 2B can be more effectively prevented from being mutually affected by external stress between the first lens 2A and the second lens 2B during thermal expansion.

Other configurations and operational effects are similar to those of the lens unit 22 shown in FIG. 13. Explanations thereof are omitted.

Second Variation Example of the Second Embodiment

Next, FIG. 15 shows a preferred configuration of an instance in which a diaphragm 36 serving as an optical component is interposed between the first lens 2A and the second lens 2B, as a second variation example of the lens unit 22 having a two-lens structure shown in FIG. 13.

Like the lens unit 22 shown in FIG. 13, the second lens 2B in the second variation example is formed from a material having a greater linear expansion coefficient than the material forming the first lens 2A. The first lens 2A is formed from a material having a greater linear expansion coefficient than the material forming the diaphragm 3.

As shown in FIG. 15, in the second variation example, the first lens side positioning reference surface 28 is not in direct contact with the second lens first positioning reference surface 29. The diaphragm 36 is sandwiched between the reference surfaces 28 and 29. However, as shown in FIG. 15, the diaphragm 36 is formed having a shape in which a front surface on the object side and a front surface on the image surface side are both perpendicular to the optical axis 5 direction. Therefore, the first lens side positioning reference surface 28 is held parallel to the second lens first positioning reference surface 29 via the diaphragm 36. As a result, the first lens 2A is held on the second lens 2B upon being appropriately positioned.

A diaphragm side tapered surface 38 serving as an angled section is formed on the outer circumferential surface of the diaphragm 36. The diaphragm side tapered surface 38 is formed having a shape angling inward in the radial direction towards the image surface side.

The second lens side first tapered surface 32 comes into contact with the diaphragm side tapered surface 38 from the outer side in the radial direction and the image surface side in the optical axis 5 direction. As a result, the diaphragm 36 can be stably held.

In a lens unit 37 of the second variation example, configured as described above, the second lens 2B is formed from a material having a greater linear expansion coefficient than the material forming the diaphragm 36. In addition, the second lens side first tapered surface 32 comes into contact with the diaphragm side tapered surface 38 from the outer side in the radial direction. Therefore, the second lens 2B can thermally expand such that the second lens side first tapered surface 32 separates from the diaphragm side tapered surface 38 outward in the radial direction. The thermal expansion of the second lens 2B may be accompanied by sliding between the second lens side first tapered surface 32 and the diaphragm side tapered surface 38. However, unlike when pressing occurs, the sliding does not cause external stress. As a result, the second lens 2B and the diaphragm 36 can be more effectively prevented from being mutually affected by external stress between the second lens 2B and the diaphragm 36 during thermal expansion.

Other configurations and operational effects are similar to those of the lens unit 22 shown in FIG. 13. Explanations thereof are omitted.

In the second variation example, although the diaphragm 36 is interposed between the first lens 2A and the second lens 2B, the lenses 2A and 2B are still adjacent to each other in the optical axis 5 direction with the tapered surfaces 31 and 32 therebetween. Therefore, the stress preventing gap dOA3 according to the second embodiment is not prevented from being a gap in the optical axis direction formed between two optical components 2A and 2B adjacent to each other in the optical axis direction.

Third Variation Example of the Second Embodiment

Next, FIG. 16 shows a third variation example of the lens unit 22 having a two-lens structure shown in FIG. 13.

A lens unit 40 of the third variation example has a configuration similar to the lens unit 35 of the first variation example shown in FIG. 14. Therefore, the lens unit 40 of the third variation example will be described focusing on differences between the lens unit 40 of the third variation example and the lens unit 35 of the first variation example for convenience.

As shown in FIG. 16, the lens unit 40 of the third variation example differs from the lens unit 35 of the first variation example in that the diaphragm 36 is interposed between the first lens 2A and the second lens 2B, and the stress preventing gap $d_{OA3}$ in the optical axis 5 direction is formed between the diaphragm 36 and the first lens 2A.

As shown in FIG. 16, a diaphragm side tapered surface 38 is formed as an angled section on the outer circumferential surface of the diaphragm 36. The diaphragm side tapered surface 38 is formed having a shape angling outward in the radial direction towards the image surface side.

The first lens side second tapered surface 31 comes into contact with the diaphragm side tapered surface 38 from the outer side in the radial direction and the object side in the optical axis 5 direction.

The first lens 2A is formed from a material having a greater linear expansion coefficient than the material forming the diaphragm 36.

In the lens unit 40 of the third variation example, configured as described above, because the stress preventing gap $d_{OA3}$ in the optical axis 5 direction is formed between the diaphragm 36 and the first lens 2A, the first lens 2A does not press against the diaphragm 36 during thermal expansion. The first lens 2A and the diaphragm 36 can be prevented from being mutually affected by the external stress in the optical axis 5 direction between the first lens 2A and the diaphragm 36.

Moreover, the first lens 2A is formed from a material having a greater linear expansion coefficient than the material forming the diaphragm 36. In addition, the first lens side second tapered surface 31 comes into contact with the diaphragm side tapered surface 38 from the outer side in the radial direction. Therefore, the first lens 2A can thermally expand such that the first lens side second tapered surface 31 separates from the diaphragm side tapered surface 38 outward in the radial direction. The thermal expansion of the first lens 2A may be accompanied by sliding between the first lens side second tapered surface 31 and the diaphragm side tapered surface 38. However, unlike when pressing occurs, the sliding does not cause external stress. As a result, the first lens 2A and the diaphragm 36 can be effectively prevented from being mutually affected by external stress between the first lens 2A and the diaphragm 36 during thermal expansion.

Other configurations and operational effects are similar to those of the lens unit of the first variation example. Explanations thereof are omitted.

Fourth Variation Example of the Second Embodiment

Next, FIG. 17 shows a fourth variation example of the lens unit 22 having a two-lens structure shown in FIG. 13.

As shown in FIG. 17, like the lens units of the first to third variation examples, in a lens unit 43 of the fourth variation example, a diaphragm 42 is interposed between the first lens 2A and the second lens 2B.

However, unlike the diaphragm 36 of the first to third variation examples, the diaphragm 42 of the fourth variation example has two tapered surfaces 45 and 46, in as a diaphragm side first tapered surface 45 and a diaphragm side second tapered surface 46 opposing the diaphragm side first tapered surface 45 on the image surface side in the optical axis 5 direction.

As shown in FIG. 17, the diaphragm side first tapered surface 45 is formed having an outer circumferential tapered shape angled inward in the radial direction towards the object side in the optical axis 5 direction. On the other hand, the diaphragm side second tapered surface 46 is formed having an outer circumferential tapered shape angled inward in the radial direction towards the image surface side in the optical axis 5 direction.

As shown in FIG. 17, the first lens side second tapered surface 31 comes into contact with the diaphragm side first tapered surface 45 from the outer side in the radial direction and the object side in the optical axis 5 direction In the fourth variation example, the first lens side second tapered surface 31 is formed having an inner circumferential tapered shape angled inward in the radial direction toward the object side in the optical axis 5 direction.

As shown in FIG. 17, the second lens side first tapered surface 32 comes into contact with the diaphragm side second tapered surface 46 from the outer side in the radial direction and the image surface side in the optical axis 5 direction. In the fourth variation example, the second lens side first tapered surface 32 is formed having an inner circumferential tapered shape angled inward in the radial direction toward the image surface side in the optical axis direction.

Moreover, an outer circumferential edge 42a of the diaphragm 42 has a shape in which a front surface on the object side and a front surface on the image surface side are both perpendicular to the optical axis 5 direction. The second lens side first positioning reference surface 29 comes into contact with the front surface of the outer circumferential edge 42a on the image surface side. The first lens side positioning reference surface 28 comes into contact with the front surface of the outer circumferential edge 42a on the object side.

In the fourth variation example, the first lens 2A is formed from a material having a greater linear expansion coefficient than the material forming the diaphragm 42. The second lens 2B is also formed from a material having a greater linear expansion coefficient than the material forming the diaphragm 42.

In the lens unit 43 of the fourth variation example, configured as described above, the first lens 2A is formed from a material having a greater linear expansion coefficient than the material forming the diaphragm 42. In addition, the first lens side second tapered surface 31 comes into contact with the diaphragm side first tapered surface 45 from the outer side in the radial direction. Therefore, the first lens 2A can thermally expand such that the first lens side second tapered surface 31 separates from the diaphragm side first tapered surface 45 outward in the radial direction. The thermal expansion of the first lens 2A may be accompanied by sliding between the first lens side second tapered surface 31 and the diaphragm side first tapered surface 45. However, unlike when pressing occurs, the sliding does not cause external stress. As a result, the first lens 2A and the diaphragm 42 can be effectively prevented from being mutually affected by external stress between the first lens 2A and the diaphragm 42 during thermal expansion.

In the fourth variation example, the second lens 2B is formed from a material having a greater linear expansion coefficient than the material forming the diaphragm 42. In addition, the second lens side first tapered surface 32 comes into contact with the diaphragm side second tapered surface 46 from the outer side in the radial direction. Therefore, the second lens 2B can thermally expand such that the second lens side first tapered surface 32 separates from the diaphragm side second tapered surface 46 outward in the radial direction. The thermal expansion of the second lens 2B may be accompanied by sliding between the second lens side first tapered surface 32 and the diaphragm side second tapered surface 46. However, unlike when pressing occurs, the sliding does not cause external stress. As a result, the second lens 2B and the diaphragm 42 can be effectively prevented from being mutually affected by external stress between the second lens 2B and the diaphragm 42 during thermal expansion.

Other configurations and operational effects are similar to those of the lens unit 22 shown in FIG. 13. Explanations thereof are omitted.

Third Embodiment

Next, a lens unit according to a third embodiment serving as the optical unit of the present invention will be described with reference to FIG. 18 to FIG. 21, focusing on differences between the lens unit according to the third embodiment and the lens units 1 and 22 according to the first and second embodiments.

Sections having the same or similar basic configuration as the lens units 1 and 22 according to the first and second embodiments are described using the same reference numbers for convenience.

As shown in FIG. 18, a main difference between a lens unit 48 according to the third embodiment and the lens units 1 and 22 according to the first and second embodiments is the number of lenses housed within the holder 7.

In other words, according to the third embodiment, in addition to the first lens 2A and the second lens 2B, a third lens 2C serving as an optical component is housed within the holder 7 such as to be adjacent to the second lens 2B on the image surface side in the optical axis 5 direction.

As shown in FIG. 18, the third lens 2C has a third lens side second positioning reference surface 51 on the front surface of the image surface side of a flange section 6C, at a position opposing the holder side positioning reference surface 23 on the object side in the optical axis direction. The third lens 2C is placed on the holding section 9 and held in a state in which positioning is performed by the third lens side second positioning reference surface 51 coming into contact with the holder side positioning reference surface 23.

The third lens 2C has a third lens side second tapered surface 52 on the front surface of the image surface side of the flange section 6C, at a position adjacent to the third lens side second positioning reference surface 51 on the inner side in the radial direction and opposing the holder side first tapered surface 11b on the object side in the optical axis 5 direction. The third lens side second tapered surface 52 is formed having an inner circumferential tapered shape and serves as an angled section (an aspect of the second contacting section). Like the holder side first tapered surface 11b, a surface shape of the third lens side second tapered surface 52 is formed having a shape angling inwards in the radial direction towards the object side in the optical axis 5 direction. In a state in which the third lens 2C is held on the holding section 9, the third lens side second tapered surface 52 comes into contact with the holder side first tapered surface 11b from the object side in the optical axis 5 direction and the outer side in the radial direction.

Moreover, the third lens 2C has a third lens side first positioning reference surface 54 that is perpendicular to the optical axis 5 direction. The third lens side first positioning reference surface 54 is formed on the front surface of the flange section 6C on the object side, at a position opposing the second lens side second positioning reference surface 24 on the image surface side in the optical axis 5 direction. The second lens 2B is placed on the third lens 2C and held in a state in which positioning is performer by the second lens side second positioning reference surface 24 coming into contact with the third lens side first positioning reference surface 54.

Moreover, the third lens 2C has a third lens side first tapered surface 55 on the front surface of the flange section 6C on the object side, at a position adjacent to the third lens side first positioning reference surface 54 on the outer side in the radial direction and opposing the second lens side second tapered surface 25 on the image surface side in the optical axis 5 direction. The third lens side first tapered surface 55 is formed having an outer circumferential tapered shape and serves as an angled section (an aspect of the second contacting section). Like the second lens side second tapered surface 25, a surface shape of the third lens side first tapered surface 55 is formed having a shape angling inwards in the radial direction towards the object side in the optical axis 5 direction. The second lens side second tapered surface 25 and the third lens side first tapered surface 55 have a relationship in which the second lens side second tapered surface 25 and the third lens side first tapered surface 55 respectively serve as an aspect of the fifth contacting section and an aspect of the sixth contacting section. In a state in which the second lens 2B is held on the third lens 2C, the second lens side second tapered surface 25 comes into contact with the third lens side first tapered surface 55 from the object side in the optical axis 5 direction and the outer side in the radial direction.

According to the third embodiment, the third lens 2C has a ring-shaped flange outer circumferential edge upper end surface 56 that is perpendicular to the optical axis 7 direction. The flange outer circumferential edge upper end surface 56 is formed on the front surface of the flange section 6C on the object side, at a position adjacent to the third lens side first tapered surface 55 on the outer side in the radial direction. The flange outer circumferential edge upper end surface 56 opposes a section on the front surface on the image surface side of the flange section 6B of the second lens 2B adjacent to the second lens side second tapered surface 25 on the outer side in the radial direction, with a stress preventing gap $d_{OA4}$ therebetween.

Moreover, according to the third embodiment, an inner diameter of the inner circumferential surface 7A of the holder 7 is uniform. Stress preventing gaps $d_{r1}$, $d_{r2}$, and $d_{r3}$ in the radial direction are respectively formed between the inner circumferential surface 7A of the holder 7 and the outer diameters of each lens 2A, 2B, and 2C.

Moreover, according to the third embodiment, the second lens 2B is formed from a material having a greater linear expansion coefficient than the material forming the third lens 2C. The third lens 2C is formed from a material having a greater linear expansion coefficient than the materials forming the holder 7 and the pressing component 14.

In the lens unit 48 according to the third embodiment, configured as described above, because the stress preventing gaps $d_{r1}$, $d_{r2}$, and $d_{r3}$ in the radial direction are respectively formed between the outer diameters of each lens 2A, 2B, and 2C and the inner circumferential surface 7A of the holder 7, the lenses 2A, 2B, and 2C can be prevented from pressing against the inner circumferential surface 7A of the holder 7 during thermal expansion when reflow soldering is performed. Therefore, the lenses 2A, 2B, and 2C can be prevented from being affected by the external stress in the radial direction from the holder 7.

According to the third embodiment, because the stress preventing gap $d_{OA4}$ in the optical axis 5 direction is formed between the second lens 2B and the third lens 2C, the second lens 2B foes not press against the third lens 2C during thermal expansion. The second lens 2B and the third lens 2C can be prevented from being mutually affected by the external stress in the optical axis 5 direction between the first lens 2A and the second lens 2B.

Moreover, according to the third embodiment, the second lens 2B is formed from a material having a greater linear expansion coefficient than the material forming the third lens 2C. In addition, the second lens side second tapered surface 25 comes into contact with the third lens side first tapered surface 55 from the outer side in the radial direction. Therefore, the second lens 2B can thermally expand such that the second lens side second tapered surface 25 separates from the third lens side first tapered surface 55 outward in the radial direction. The thermal expansion of the second lens 2B may be accompanied by sliding between the second lens side second tapered surface 25 and the third lens side first tapered surface 55. However unlike when pressing occurs, the sliding does not cause external stress. As a result, the second lens 2B and the third lens 2C can be more effectively prevented from being mutually affected by external stress between the second lens 2B and the third lens 2C during thermal expansion.

Other configurations and operational effects are similar to those of the lens unit 22 according to the second embodiment. Explanations thereof are omitted.

First Variation Example of the Third Embodiment

Next, FIG. 19 shows a first variation example of the lens unit 48 having a three-lens structure shown in FIG. 18.

In a lens unit 59 of the first variation example, the third lens 2C is formed from a material having a greater linear expansion coefficient than the material forming the second lens 2B.

In accompaniment, in the first variation example, as shown in FIG. 19, the third lens side first tapered surface 55 comes into contact with the second lens side second tapered surface 25 from the outer side in the radial direction. More specifically, the third lens side first tapered surface 55 of the first variation example is formed having an inner circumferential tapered shape that angles inward in the radial direction towards the image surface side in the optical axis 5 direction. On the other hand, the second lens side second tapered surface 25 of the first variation example is formed having an outer circumferential tapered shape that angles inward in the radial direction towards the image surface side in the optical axis 5 direction.

In the lens unit 59 of the first variation example, configured as described above, the third lens 2C is formed from a material having a greater linear expansion coefficient than the material forming the second lens 2B. In addition, the third lens side first tapered surface 55 comes into contact with the second lens side second tapered surface 25 from the outer side in the radial direction. Therefore, the third lens 2C can thermally expand such that the third lens side first tapered surface 55 separates from the second lens side second tapered surface 25 outward in the radial direction. The thermal expansion of the third lens 2C may be accompanied by sliding between the third lens side first tapered surface 55 and the second lens side second tapered surface 25. However, unlike when pressing occurs, the sliding does not cause external stress. As a result, the second lens 2B and the third lens 2C can be more effectively prevented from being mutually affected by external stress between the second lens 2B and the third lens 2C during thermal expansion.

Other configurations and operational effects are similar to those of the lens unit 48 shown in FIG. 18. Explanations thereof are omitted.

Second Variation Example of the Third Embodiment

Next, FIG. 20 shows a second variation example of the lens unit 48 having a three-lens structure shown in FIG. 18.

In a lens unit 60 of the second variation example, the first lens 2A is formed from a material having a greater linear expansion coefficient than the material forming the second lens 2B. The second lens 2B is formed from a material having a greater linear expansion coefficient than the material forming the third lens 2C.

In accompaniment, in the second variation example, as shown in FIG. 20, the first lens side second tapered surface 31 comes into contact with the second lens side first tapered surface 32 from the outer side in the radial direction. More specifically, the first lens side second tapered surface 31 of the second variation example is formed having an inner circumferential tapered shape that angles inward in the radial direction towards the object side in the optical axis 5 direction. On the other hand, the second lens side first tapered surface 32 of the second variation example is formed having an outer circumferential tapered shape that angles inward in the radial direction towards the object side in the optical axis 5 direction.

In the lens unit 60 of the second variation example, configured as described above, the first lens 2A is formed from a material having a greater linear expansion coefficient than the material forming the second lens 2B. In addition, the first lens side second tapered surface 31 comes into contact with the second lens side first tapered surface 32 from the outer side in the radial direction. Therefore, the first lens 2A can thermally expand such that the first lens side second tapered surface 31 separates from the second lens side first tapered surface 32 outward in the radial direction The thermal expansion of the first lens 2A may be accompanied by sliding between the first lens side second tapered surface 31 and the second lens side first tapered surface 32. However, unlike when pressing occurs, the sliding does not cause external stress. As a result, the first lens 2A and the second lens 2B can be more effectively prevented from being mutually affected by external stress between the second lens 2B and the third lens 2C during thermal expansion.

In the second variation example, the stress preventing gap dOA3 in the optical axis 5 direction between the first lens 2A and the second lens 2B and the stress preventing gap dOA4 in the optical axis 5 direction between the second lens 2B and the third lens 2B shown in FIG. 18 are formed between the flange section and the lens surface.

Other configurations and operational effects are similar to those of the lens unit 48 shown in FIG. 18. Explanations thereof are omitted.

Third Variation Example of the Third Embodiment

Next, FIG. 21 shows a third variation example of the lens unit 48 having a three-lens structure shown in FIG. 18.

A lens unit 61 of the third variation example has a configuration similar to the configuration of the lens unit 60 of the second variation example according to the third embodiment in FIG. 20. Therefore, the lens unit 61 of the third variation example will be described below, focusing on differences between the lens unit 61 of the third variation example and the lens unit 60 of the second variation example for convenience.

As shown in FIG. 21, the differences between the lens unit 61 of the third variation example and the lens unit 60 of the second variation example are the magnitude correlation between the linear expansion coefficients of the material forming the second lens 2B and the material forming the third lens 2C, and orientation of the second lens side second tapered surface 25 and the opposing third lens side first tapered surface 55.

In other words, in the third variation example, the third lens 2C is formed from a material having a greater linear expansion coefficient than the material forming the second lens 2B. The material forming the first lens 2A is merely required to be a material having a greater linear expansion coefficient than the material forming the second lens 2B. In terms of cost reduction, a same material as that used for the third lens is preferably used for the first lens.

In the third variation example, as shown in FIG. 21, the third lens side first tapered surface 55 comes into contact with the second lens side second tapered surface 25 from the outer side in the radial direction. More specifically, the third lens side first tapered surface 55 of the third variation example is formed having an inner circumferential tapered shape that angles inward in the radial direction towards the image surface side in the optical axis 5 direction. On the other hand, the second lens side second tapered surface 25 of the third variation example is formed having an outer circumferential tapered shape that angles inward in the radial direction towards the image surface side in the optical axis 5 direction.

In the lens unit 61 of the third variation example, configured as described above, the third lens 2C is formed from a material having a greater linear expansion coefficient than the material forming the second lens 2B. In addition, the third lens side first tapered surface 55 comes into contact with the second lens side second tapered surface 25 from the outer side in the radial direction. Therefore, the third lens 2C can thermally expand such that the third lens side first tapered surface 55 separates from the second lens side second tapered surface 25 outward in the radial direction. The thermal expansion of the third lens 2C may be accompanied by sliding between the third lens side first tapered surface 55 and the second lens side second tapered surface 25. However, unlike when pressing occurs, the sliding does not cause external stress. As a result, the second lens 2B and the third lens 2C can be more effectively prevented from being mutually affected by external stress between the second lens 2B and the third lens 2C during thermal expansion.

Other configurations and operational effects are similar to those of the lens unit 60 of the second variation example. Explanations thereof are omitted.

According to all embodiments among the embodiments of the present invention, excluding the first variation example of the first embodiment, when a lens having a linear expansion coefficient greater than the holder is housed within the holder is described. In other words, according to these embodiments, when the holder formed from a material having a relatively small linear expansion coefficient is disposed on the outer side in the radial direction of the lens formed from a material having a relatively large linear expansion coefficient, a gap wide enough to allow lens expansion is formed between the lens and the holder, thereby preventing external stress from being applied. As a means of positioning the lens within the holder, the holding section is formed on the lower side (image surface side) of the lens. The holding section is formed from the same material forming the holder that has a relatively small linear expansion coefficient. The tapered surfaces, configured as described above, are formed in the contacting sections of the holding section and the lens. As a result of the configurations described above, according to the embodiments, the holding section and be formed integrally with the holder, thereby reducing a number of components. Such effects can be similarly achieved when, for example, an optical component other than the lens is held on the holding section via the tapered surfaces.

The present invention is not limited to the embodiments described above. Various modifications can be made as required.

For example, in the optical unit of the present invention, two components having different linear expansion coefficients come into contact with each other at respective angled sections, allowing positioning of each component in the radial direction to be performed. An angle direction of the angled section is formed such that the angled section become closer to the optical axis towards a side in the optical direction on which the component with the large linear expansion coefficient is disposed (in other words, angled towards the inner side in the radial direction). In addition, at a cross-section passing through the angled section and perpendicular to the optical axis direction the component with the large linear expansion coefficient is disposed on the outer side and the component with the small linear expansion coefficient is disposed on the inner side. Embodiments other than those described above can also be applied.

More specifically, the present invention can also be applied to an optical unit including an optical component having an outer circumferential surface that is other than circular and a holder having an inner circumferential surface that is other than circular.

Placement of the lens side and holder side positioning reference surfaces, and placements and dimensions of the stress preventing gaps, described above, are not limited to those according to the embodiments described above. Various modifications can be made as required. However, the dimensions of the stress preventing gaps are required to be dimensions that can appropriately prevent the effects of external stress depending on the linear expansion coefficients of the lens, the pressing component, and the holder, and the placement positions of the stress preventing gaps.

Moreover, when the linear expansion coefficients of a plurality of optical components adjacent to each other in the optical axis 5 direction are equal to each other, either tapered surface between the tapered surfaces of the optical components in contact with each other can be disposed on the outer side of the other tapered surface in the radial direction.

Moreover, an angled surface other than the above-described tapered surface can be used as the angled section.

The present invention can also be effectively applied to a lens unit 86 shown in FIG. 22, in which the holding section 9 of the holder 7 is disposed on the object side of the lens 2, the pressing component 14 is disposed on the image surface side of the lens 2, and the upper end surface 16a of the pressing component inner piece 16 in FIG. 22 serves as the positioning reference surface of the lens 2. In FIG. 22, $d_{OA}$ indicates the stress preventing gap in the optical axis 5 direction, and $d_R$ indicates the stress preventing gap in the radial direction.

What is claimed is:

1. An optical unit comprising:
at least one optical component;
a holder that is a cylindrical holder housing the optical component, in which a holding section for holding the optical component from one side in the direction of the optical axis direction is formed on an inner circumferential surface of a holder main body such as to project towards an inner side in a radial direction perpendicular to the optical axis direction; and
a pressing component disposed at a position opposing the holding section in the optical axis direction with the optical component therebetween and formed such as to press the optical component housed within the holder from another side in the direction of the optical axis, wherein
a first contacting section allowing the holding section and the optical component adjacent to the holding section to come into contact with each other is formed in the holding section at a position opposing, in the optical axis direction the optical component adjacent to the holding section,
a second contacting section allowing the holding section and the optical component adjacent to the holding section to come into contact with each other is formed on the optical component adjacent to the holding section at a position opposing the holding section in the optical axis direction;
one contacting section of the first and second contacting sections is formed angled in relation to the optical axis direction, and the other contacting section of the first and second contacting sections is formed such as to come into contact with the one contacting section of the first and second contacting sections through point contact, linear contact, or surface contact;
a third contacting section allowing the pressing component and the optical component adjacent to the pressing component to come into contact with each other is formed on the pressing component at a position opposing, in the optical axis direction, the optical component adjacent to the pressing component;
a fourth contacting section allowing the pressing component and the optical component adjacent to the pressing component to come into contact with each other is formed on the optical component adjacent to the pressing component at a position opposing the pressing component in the optical axis direction;
one contacting section of the third and fourth contacting sections is formed angled in relation to the optical axis direction, and the other contacting section of the third and fourth contacting sections is formed such as to come into contact with the one contacting section of the third and fourth contacting sections through point contact, linear contact, or surface contact;
a gap section in the radial direction preventing the optical component from being affected by external stress from the holder when the optical component and the holder thermally expand is formed between an outer circumferential surface of the optical component and the inner circumferential surface of the holder; and
a gap section in the optical axis direction preventing the optical component disposed between the pressing component and the holding section from being affected by external stress such as that pressing the optical component in the optical axis direction when the optical component, the pressing component, and the holder thermally expand is formed on at least one of a section between predetermined surfaces of the pressing component and the optical component adjacent to the pressing component opposing each other in the optical axis direction, and a section between predetermined surfaces of the holding section and the optical component adjacent to the holding section opposing each other in the optical axis direction.

2. The optical unit according to claim 1, wherein:
the optical component adjacent to the holding section is formed from a material having a greater linear expansion coefficient than a material forming the holding section; and
the second contacting section formed on the optical component adjacent to the holding section is positioned further to the outer side in the radial direction than the first contacting section formed on the holding section.

3. The optical unit according to claim 2, wherein:
the first contacting section formed on the holding section and the second contacting section formed on the optical component adjacent to the holding section are both formed as an angled section at an angle in relation to the optical axis direction; and the angled section formed on the optical component adjacent to the holding section and the angled section formed on the holding section are both formed having a shape angling inward in the radial direction towards the pressing component side in the optical axis direction.

4. The optical unit according to claim 1, wherein:
the optical component adjacent to the holding section is formed from a material having a smaller linear expansion coefficient than a material forming the holding section; and
the second contacting section formed on the optical component adjacent to the holding section is positioned further to the inner side in the radial direction than the first contacting section formed on the holding section.

5. The optical unit according to claim 4, wherein:
the first contacting section formed on the holding section and the second contacting section formed on the optical component adjacent to the holding section are both formed as an angled section at an angle in relation to the optical axis direction; and
the angled section formed on the optical component adjacent to the holding section and the angled section formed on the holding section are both formed having a shape angling outward in the radial direction towards the pressing component side in the optical axis direction.

6. The optical unit according to claim 1, wherein:
the optical component adjacent to the pressing component is formed from a material having a greater linear expansion coefficient than a material forming the pressing component; and
the fourth contacting section formed on the optical component adjacent to the pressing component is positioned further to the outer side in the radial direction than the third contacting section formed on the pressing component.

7. The optical unit according to claim 6, wherein:
the third contacting section formed on the pressing component and the fourth contacting section formed on the optical component adjacent to the pressing component are both formed as an angled section at an angle in relation to the optical axis direction; and
the angled section formed on the optical component adjacent to the pressing component and the angled section formed on the pressing component are both formed having a shape angling inward in the radial direction towards the holding section side in the optical axis direction.

8. The optical unit according to claim 1, wherein:
the optical component adjacent to the pressing component is farmed from a material having a smaller linear expansion coefficient than a materiaJ forming the pressing component; and
the fourth contacting section formed on the optical component adjacent to the pressing component is positioned further to the inner side in the radial direction than the second contacting section formed on the pressing component.

9. The optical unit according to claim 8, wherein:
the third contacting section formed on the pressing component and the fourth contacting section formed on the optical component adjacent to the pressing component are both formed as an angled section at an angle in relation to the optical axis direction; and
the angled section formed on the optical component adjacent to the pressing component and the angled section formed on the pressing component are both formed having a shape angling outward in the radial direction towards the holding section side in the optical axis direction.

10. The optical unit according to claim 1, wherein the angled section formed on at least one of the holding section and the optical component adjacent to the holding section and the angled section formed on at least one of the pressing component and the optical component adjacent to the pressing component are formed as a tapered surface.

11. The optical unit according to claim 1, wherein:
a plurality of optical components are housed within the holder such as to be overlapping in the optical axis direction;
a fifth contacting section is formed on one optical component of two arbitrary optical components adjacent to each other in the optical axis direction, among the plurality of optical components, at a position opposing the other optical component of the two optical components in the optical axis direction, the fifth contacting section allowing the two optical components to come into contact with each other;
a sixth contacting section allowing the two optical components to come into contact with each other is formed on the other optical component of the two optical components at a position opposing the one optical component of the two optical components in the optical axis direction;
one contacting section of the fifth and sixth contacting section is formed as an angled section at an angle in relation to the optical axis direction, and the other contacting section of the fifth and sixth contacting section is formed as an angled section at an angle in relation to the optical axis direction or an angled section having a shape that comes into contact with the one contacting section of the fifth and sixth contacting sections through point contact linear contact, or surface contact; and
a gap section in the optical axis direction preventing the two optical components from being mutually affected by external stress between the two optical components during thermal expansion is formed between predetermined surfaces of the two optical components opposing each other in the optical axis direction.

12. The optical unit according to claim 11, wherein:
the one optical component of the two optical components is formed from a material having a greater linear expansion coefficient than a material forming the other optical component; and
the fifth contacting section formed on the one optical component is positioned further to the outer side in the radial direction than the sixth contacting section formed on the other optical component.

13. The optical component according to claim 12, wherein the fifth and sixth contacting sections respectively formed on the two optical components are both formed as an angled section at an angle in relation to the optical axis direction.

14. The optical component according to claim 11, wherein the angled section formed on at least one of the two optical components is formed as a tapered surface.

15. The optical component according to claim 1, wherein the optical components include a lens.

16. The optical unit according to claim 15, wherein the optical unit is mounted on an imaging device.

* * * * *